US012604045B2

(12) United States Patent
Zhang et al.

(10) Patent No.: US 12,604,045 B2
(45) Date of Patent: Apr. 14, 2026

(54) ENCODING CONTROL METHOD AND APPARATUS, AND DECODING CONTROL METHOD AND APPARATUS

(71) Applicant: VIVO MOBILE COMMUNICATION CO., LTD., Dongguan (CN)

(72) Inventors: Wei Zhang, Dongguan (CN); Tengya Tian, Dongguan (CN); Zhuoyi Lv, Dongguan (CN); Fuzheng Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 172 days.

(21) Appl. No.: 18/533,390

(22) Filed: Dec. 8, 2023

(65) Prior Publication Data

US 2024/0137579 A1 Apr. 25, 2024
US 2024/0236381 A9 Jul. 11, 2024

Related U.S. Application Data

(63) Continuation of application No. PCT/CN2022/097636, filed on Jun. 8, 2022.

(30) Foreign Application Priority Data

Jun. 11, 2021 (CN) .......................... 202110656103.3
Dec. 6, 2021 (CN) .......................... 202111478748.9

(51) Int. Cl.
*H04N 19/96* (2014.01)
*H04N 19/157* (2014.01)
(Continued)

(52) U.S. Cl.
CPC ........... *H04N 19/96* (2014.11); *H04N 19/157* (2014.11); *H04N 19/176* (2014.11); *H04N 19/1883* (2014.11)

(58) Field of Classification Search
None
See application file for complete search history.

(56) References Cited

U.S. PATENT DOCUMENTS

2020/0396489 A1* 12/2020 Flynn ......................... G06T 9/00
2022/0156980 A1* 5/2022 Zhang ........................ G06T 9/40
(Continued)

FOREIGN PATENT DOCUMENTS

CN 112470469 A 3/2021
CN 112514394 A 3/2021
(Continued)

OTHER PUBLICATIONS

Lasserre, Sebasian et al. (BlackBerry), "[PCC] Inference of a mode using point location direct coding in TMC3", Motion Picture Expert Group or Iso/Iec JTC1/SC29/WG11, Jan. 21, 2018, XP030070581.

*Primary Examiner* — Kaitlin A Retallick
(74) *Attorney, Agent, or Firm* — The Webb Law Firm

(57) ABSTRACT

An encoding control method includes obtaining a current to-be-processed node in a target queue, where the target queue includes nodes whose corresponding space blocks are occupied in a constructed tree structure; obtaining a first mode identifier of the current to-be-processed node; and in a case that the first mode identifier is a first identifier, if nodes that have been processed continuously meet a first condition, performing multiway tree occupancy encoding on the current to-be-processed node; where the first condition includes that: a mode identifier of the node that has been processed continuously is the first identifier and a number of nodes that have been processed continuously is less than a first threshold.

20 Claims, 7 Drawing Sheets

(51) Int. Cl.
    *H04N 19/169*      (2014.01)
    *H04N 19/176*      (2014.01)

(56)            References Cited

U.S. PATENT DOCUMENTS

2022/0366610 A1   11/2022   Hur et al.
2023/0316586 A1\*  10/2023   Wan ........................ G06T 9/001
                                    382/232

FOREIGN PATENT DOCUMENTS

| CN | 112514397 A | 3/2021 |
|----|-------------|--------|
| CN | 112565794 A | 3/2021 |
| CN | 112740707 A | 4/2021 |
| WO | 2021002604 A1 | 1/2021 |

\* cited by examiner

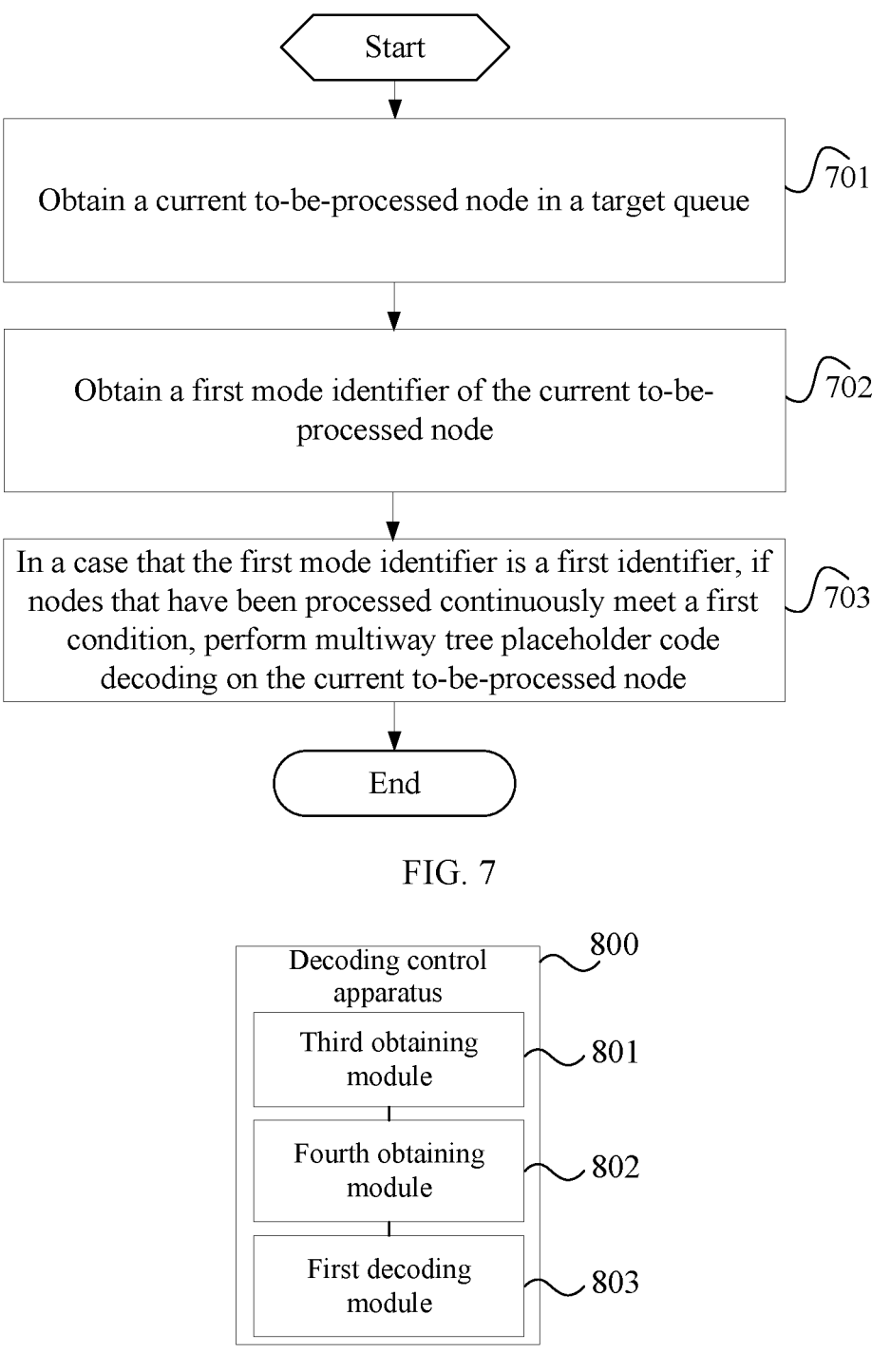

Start

Obtain a current to-be-processed node in a target queue    701

Obtain a first mode identifier of the current to-be-processed node    702

In a case that the first mode identifier is a first identifier, if nodes that have been processed continuously meet a first condition, perform multiway tree placeholder code decoding on the current to-be-processed node    703

End

FIG. 7

Decoding control apparatus    800

Third obtaining module    801

Fourth obtaining module    802

First decoding module    803

FIG. 8

ENCODING CONTROL METHOD AND APPARATUS, AND DECODING CONTROL METHOD AND APPARATUS

CROSS-REFERENCE TO RELATED APPLICATIONS

This application is a Bypass Continuation Application of International Patent Application No. PCT/CN2022/097636 filed Jun. 8, 2022, and claims priority to Chinese Patent Application No. 202110656103.3 filed Jun. 11, 2021 and Chinese Patent Application No. 202111478748.9 filed Dec. 6, 2021, the disclosures of which are hereby incorporated by reference in their entireties.

BACKGROUND OF THE INVENTION

Field of the Invention

This application belongs to the field of image processing, and especially relates to an encoding control method and apparatus and a decoding control method and apparatus.

Description of Related Art

In the process of octree construction of point cloud coding reference software model (PCRM) of the current audio video coding standard (AVS), before octree coding of nodes, it also needs to be determined whether to directly code single points of nodes.

SUMMARY OF THE INVENTION

According to a first aspect, an encoding control method is provided, including:

obtaining a current to-be-processed node in a target queue, where the target queue includes nodes whose corresponding space blocks are occupied in a constructed tree structure;

obtaining a first mode identifier of the current to-be-processed node; and in a case that the first mode identifier is a first identifier, if nodes that have been processed continuously meet a first condition, performing multiway tree occupancy encoding on the current to-be-processed node;

where the first condition includes that: a mode identifier of the node that has been processed continuously is the first identifier and a number of nodes that have been processed continuously is less than a first threshold.

According to a first aspect, a decoding control method is provided, including:

obtaining a current to-be-processed node in a target queue, where the target queue includes nodes whose corresponding space blocks are occupied in a constructed tree structure;

obtaining a first mode identifier of the current to-be-processed node; and in a case that the first mode identifier is a first identifier, if nodes that have been processed continuously meet a first condition, performing multiway tree occupancy code decoding on the current to-be-processed node;

where the first condition includes that: a mode identifier of the node that has been processed continuously is the first identifier and a number of nodes that have been processed continuously is less than a first threshold.

According to a third aspect, an encoding control apparatus is provided, including:

a first obtaining module, configured to obtain a current to-be-processed node in a target queue, where the target queue includes nodes whose corresponding space blocks are occupied in a constructed tree structure;

a second obtaining module, configured to obtain a first mode identifier of the current to-be-processed node; and a first encoding module, configured to: in a case that the first mode identifier is a first identifier, if nodes that have been processed continuously meet a first condition, perform multiway tree occupancy encoding on the current to-be-processed node;

where the first condition includes that: a first mode identifier of the node that has been processed continuously is the first identifier and a number of nodes that have been processed continuously is less than a first threshold.

According to a fourth aspect, an encoding control apparatus is provided, including a processor, a memory, and a program or an instruction stored in the memory and executable on the processor, where when the program or instruction is executed by the processor, steps of the method according to the first aspect are implemented.

According to a fifth aspect, an encoding control apparatus is provided, including a processor and a communication interface, where the processor is configured to obtain a current to-be-processed node in a target queue, where the target queue includes nodes whose corresponding space blocks are occupied in a constructed tree structure;

obtain a first mode identifier of the current to-be-processed node; and in a case that the first mode identifier is a first identifier, if nodes that have been processed continuously meet a first condition, perform multiway tree occupancy encoding on the current to-be-processed node;

where the first condition includes that: a mode identifier of the node that has been processed continuously is the first identifier and a number of nodes that have been processed continuously is less than a first threshold.

According to a sixth aspect, a decoding control apparatus is provided, including:

a third obtaining module, configured to obtain a current to-be-processed node in a target queue, where the target queue includes nodes whose corresponding space blocks are occupied in a constructed tree structure;

a fourth obtaining module, configured to obtain a first mode identifier of the current to-be-processed node; and a first decoding module, configured to: in a case that the first mode identifier is a first identifier, if nodes that have been processed continuously meet a first condition, perform multiway tree occupancy code decoding on the current to-be-processed node;

where the first condition includes that: a mode identifier of the node that has been processed continuously is the first identifier and a number of nodes that have been processed continuously is less than a first threshold.

According to a seventh aspect, a decoding control apparatus is provided. The decoding control apparatus includes a processor, a memory, and a program or an instruction that is stored in the memory and executable on the processor, where when the processor or the instruction is executed by the processor, steps of the method in the second aspect are implemented.

According to an eighth aspect, a decoding control apparatus is provided, including a processor and a communication interface, where the processor is configured to obtain a current to-be-processed node in a target queue, where the target queue includes nodes whose corresponding space blocks are occupied in a constructed tree structure;

obtain a first mode identifier of the current to-be-processed node; and in a case that the first mode identifier is a first identifier, if nodes that have been processed continuously meet a first condition, perform multiway tree occupancy code decoding on the current to-be-processed node;

where the first condition includes that: a mode identifier of the node that has been processed continuously is the first identifier and a number of nodes that have been processed continuously is less than a first threshold.

According to a ninth aspect, a communication device is provided. The communication device includes a processor, a memory, and a program or an instruction that is stored in the memory and executable on the processor, where when the processor or the instruction is executed by the processor, steps of the encoding control method in the first aspect are implemented or steps of the decoding control method in the second aspect are implemented.

According to a tenth aspect, a non-transitory readable storage medium is provided. The non-transitory readable storage medium stores a program or an instruction, and when the program or the instruction is executed by a processor, step of the method according to the first aspect or the second aspect is implemented.

According to an eleventh aspect, a chip is provided. The chip includes a processor and a communications interface, where the communications interface is coupled to the processor, and the processor is configured to run a program or an instruction, to implement the steps of the method in the first aspect or the second aspect.

According to a twelfth aspect, a computer program/program product is provided, the computer program/program product is stored in a non-volatile storage medium, and the program/program product is executed by at least one processor to implement the steps of the method described in the first aspect or the second aspect.

BRIEF DESCRIPTION OF THE DRAWINGS

FIG. 7 is a schematic flowchart of a decoding control method according to an embodiment of the present application;

FIG. 8 is a schematic diagram of modules of a decoding control apparatus according to an embodiment of the present application.

DESCRIPTION OF THE INVENTION

Figure 1:
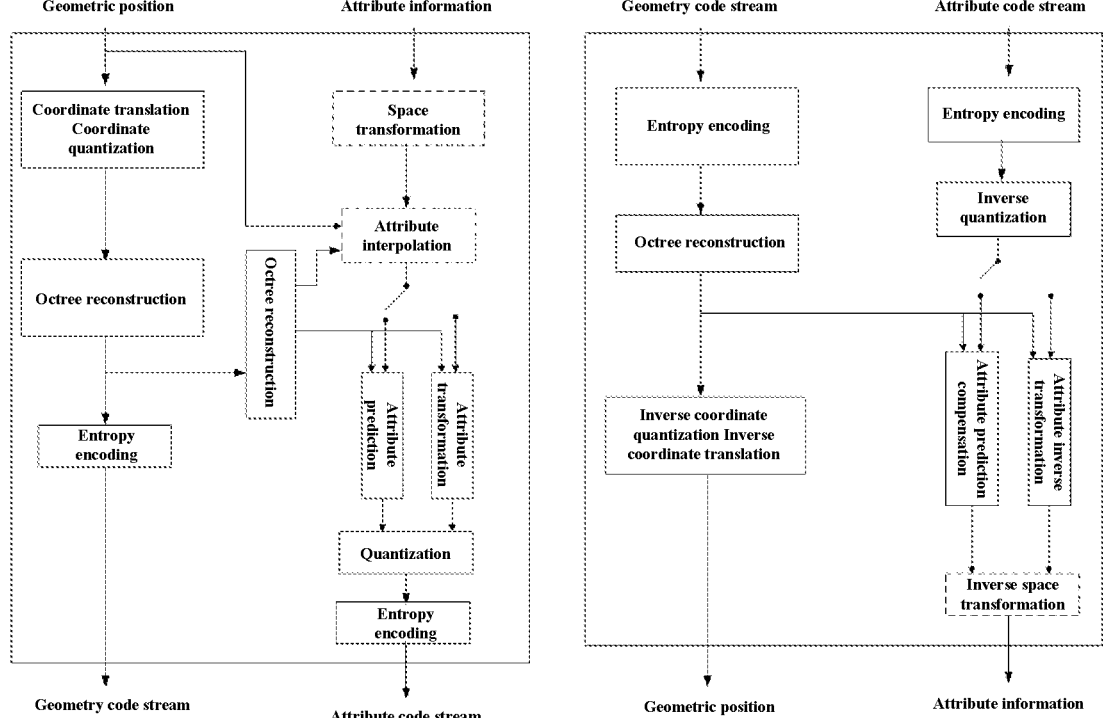
FIG. 1 is a framework diagram of an AVS codec.

The following clearly describes the technical solutions in the embodiments of this application with reference to the accompanying drawings in the embodiments of this application the described embodiments are some but not all of the embodiments of this application. All other embodiments obtained by a person of ordinary skill in the art based on the embodiments of this application shall fall within the protection scope of this application.

In the specification and claims of this application, the terms such as "first" and "second" are used for distinguishing similar objects, and are not necessarily used to describe a particular order or sequence. It is to be understood that the terms so used are interchangeable under appropriate circumstances such that the embodiments of the application can be implemented in sequences other than those illustrated or described herein, and "first" and "second" generally distinguish objects of a same type, and the number of objects is not limited. For example, there may be one or more first objects. In addition, in the specification and claims, "and/or" means at least one of connected objects, and the character "I" generally means that associated objects are in an "or" relationship.

The following briefly introduces the common technology as follows.

When only one point is included in a node to be coded, this point is called a single point; the single point direct encoding means that geometric coordinates of the coded single point correspond to uncoded bits of Morton code. Direct encoding is performed when the current node meets the following three conditions:

condition 1. A direct encoding mode identifier of the single point in geometry header information is 1.

condition 2: The current node contains only one point.

condition 3: The sum of bits of the to-be-coded Morton code of points of the current node is greater than twice the number of directions that do not reach the minimum side length.

When the above three conditions are all true, this branch is entered, a flag bit is introduced and is called a geometric single point mode flag (single Point Flag), and indicates whether the current node uses the single point encoding, and this flag bit represents whether the current node contains only one point. When the node contains only one point, the value of the flag bit is 1, and when the number of points contained in the node is greater than 1, the value of the flag bit is 0. After encoding the flag bit, if the flag bit is 1, that is, the current node contains only one point, uncoded bits of the Morton code corresponding to geometric coordinates of the point are directly coded, that is, are coded sequentially according to the order of x, y, and z. Coordinates in a direction that has reached the minimum side length do not need to be coded, and the octree division is ended at the same time. If the flag bit is 0, the occupancy code continues to be coded and the octree continues to be divided.

Among the three conditions, condition 1 is determined by the configuration file, that is, the values of all nodes in the same sequence are the same; condition 3 is used to limit the number of layers of nodes with points having fewer to-be-coded bits, that is, nodes close to the leaf node layer. If either of condition 1 and condition 3 is 0, the encoding of single point flag is not performed. For ease of description, these two conditions are used as priori conditions of single point encoding mode. If the current node meets the priori condition, single point flag is coded, but only when condition 2 is met, that is, single point flag is 1, single point encoding is performed, otherwise, octree occupancy encoding continues to be performed.

In AVS PCRM V3.0, condition 1 is set to 1 by default, and its function is to control whether the current sequence enables the single point encoding mode. Condition 3 only limits a layer number of a node that enters the single point encoding mode, that is, a node close to the leaf node layer cannot enter the single point encoding mode. Therefore, in the existing encoder, nodes far away from the leaf node layer must be judged by condition 2, that is, single point flag needs to be coded, and nodes are not effectively screened. For example, there are the following problems:

1. For a relatively dense point cloud sequence, there are very few nodes that satisfy condition 2, that is, a large number of single point flags that are 0 are coded, and these code streams is ineffective for point cloud compression.

2. Even if for a relatively sparse point cloud, there is a case in which a certain area is relatively dense and there are few nodes that meet condition 2.

FIG. 1 is a framework diagram of an audio video coding standard (AVS) codec. In the point cloud AVS encoder framework, geometric information of point cloud and attribute information corresponding to each point are coded separately. First, the coordinate transformation is performed on the geometric information, so that the point cloud is all contained in a bounding box. Then, quantization is performed. This step of quantization mainly plays the role of scaling. Because of quantization of rounding, geometric information of some points is the same. It is determined whether to remove duplicate points according to parameters. This process of quantifying and removing duplicate points is a preprocessing process. Next, the bounding box is divided according to the order of breadth-first traversal (octree/quadtree/binary tree), and the occupancy code of every node is coded. In the octree-based geometric code framework, the bounding box is divided sequentially to obtain sub-cubes, a non-empty (including points in the point cloud) sub-cube continues to be divided until a leaf node obtained by division is a unit cube of 1×1×1 and the division is ended, and then the number of points contained in the leaf node are coded, and finally the encoding of the geometric octree is completed, to generate a binary code stream. In the octree-based geometric decoding process, the decoding end obtains the occupancy code of each node through continuous analysis in the order of breadth-first traversal, and continues to divide the nodes in turn, until the unit cube of 1×1×1 is obtained and the division is ended, obtains the number of points contained in each leaf node through analysis, and finally restores geometrically reconstructed point cloud information.

After the geometric encoding is completed, the geometric information is reconstructed. At present, attribute encoding is mainly performed for color and reflectance information. First, it is determined whether to perform color space conversion, if the color space conversion is performed, color information is converted from red, green and blue (RGB) color space to YUV color space. Then, the reconstructed point cloud is recolored with the original point cloud, so that the uncoded attribute information corresponds to the reconstructed geometric information. There are two modules in color information encoding: attribute prediction and attribute transformation. The attribute prediction process is as follows: first the point cloud is re-ordered and then differentially predicted. There are two re-ordering methods: Morton re-ordering and Hilbert re-ordering. For cat1A sequence and cat2 sequence, Hilbert reordering is performed; for cat1B sequence and cat3 sequence, Morton re-ordering is performed. Differential methods are used to predict the attributes of the sorted point cloud, and then the prediction residual is subject to quantization and entropy encoding, to generate a binary code stream. The attribute transformation process is as follows: Firstly, wavelet transformation is performed on the point cloud attributes, and transformation coefficients are quantized; secondly, the attribute reconstruction value is obtained through inverse quantization and inverse wavelet transformation; then the difference between the original attribute and the attribute reconstruction value is calculated to obtain the attribute residual and the attribute residual is subject to quantization; and then the quantized transformation coefficients and attribute residual are subject to entropy coded, to generate a binary code stream. This application relates to geometry encoding and geometry decoding, more precisely, this application is an improvement on the octree construction and octree reconstruction process of the geometry encoding and geometry decoding.

The encoding control method and apparatus and the decoding control method and apparatus provided by the embodiments of the present application will be described in detail below through some embodiments and application scenarios with reference to the accompanying drawings.

Figure 2:
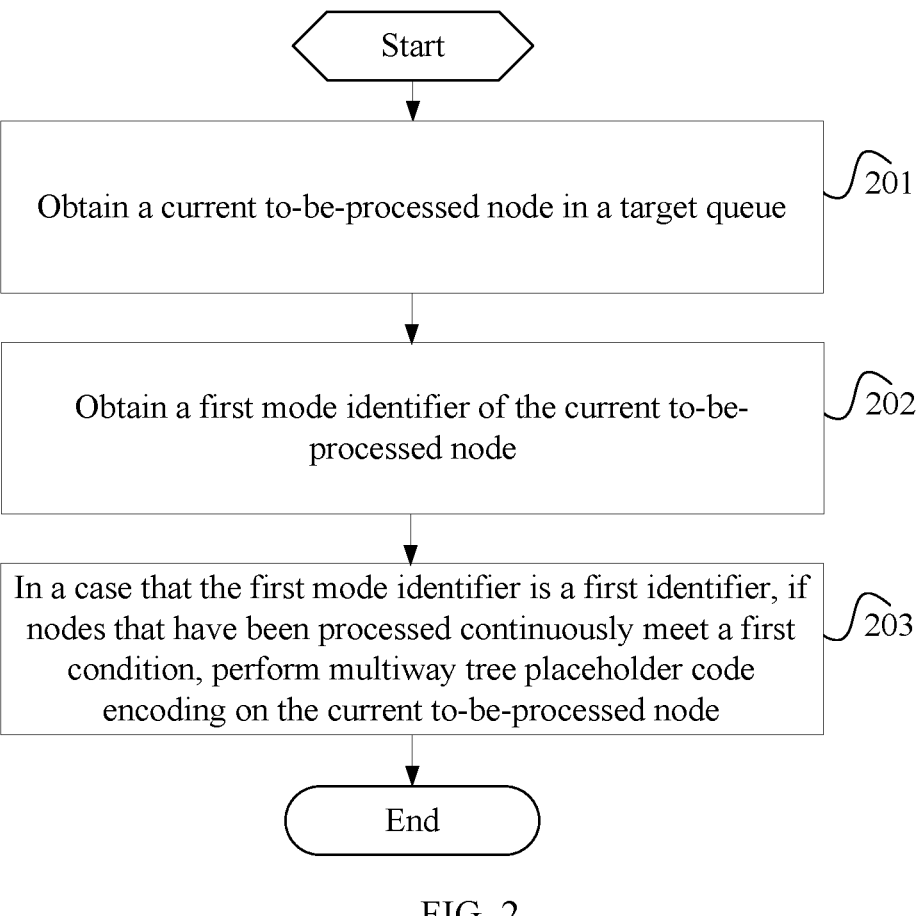
FIG. 2 is a schematic flowchart of an encoding control method according to an embodiment of the present application.

As shown in FIG. 2, this embodiment of the present application provides an encoding control method, including:

Step 201: Obtain a current to-be-processed node in a target queue.

It should be noted that the target queue includes the nodes whose corresponding space blocks are occupied in the constructed tree structure. It should be noted that for encoding, the tree structure is obtained based on the preprocessed geometric information of the point cloud. This preprocessing refers to translating, quantizing, and removing one or more duplicate points for geometric information of point cloud of the N-th (N is an integer greater than or equal to 1, which can be understood as a certain frame) frame, to obtain the geometric information of the point cloud. For decoding, the tree structure is obtained by decoding the occupation information of nodes.

Step 202: Obtain a first mode identifier of the current to-be-processed node.

It should be noted that, the first mode identifier is newly introduced in this application, and is used to perform determining before encoding processing of the to-be-processed node.

Step 203: In a case that the first mode identifier is a first identifier, if nodes that have been processed continuously meet a first condition, perform multiway tree occupancy encoding on the current to-be-processed node.

The first condition includes that: a mode identifier of the node that has been processed continuously is the first identifier and a number of nodes that have been processed continuously is less than a first threshold.

It should be noted that, in the embodiment of this application, when the first mode identifier of the current to-be-processed node is the first identifier, the number of nodes that have been continuously processed and whose mode identifier is the first identifier is determined. When the number is less than the first threshold, the multiway tree occupancy encoding is directly performed, instead of encoding the geometric single point mode identifier (single point flag) of the current to-be-processed node first. It can reduce the number of single point flags (such as the number of single point flags coded as 0) for which encoding indicates disabling of single point encoding in the process of multiway tree occupancy encoding, thereby improving encoding efficiency.

Optionally, after the step 202, the method further includes:

in a case that the first mode identifier is a first identifier, if nodes that have been processed continuously meet a second condition, encoding a geometric single point mode identifier (single point flag) corresponding to the current to-be-processed node;

setting a first mode identifier of a next to-be-processed node according to the geometric single point mode identifier;

where the second condition includes that: a first mode identifier of the node that has been continuously processed is the first identifier, the number of the nodes that have been continuously processed is equal to the first threshold, and among the nodes that have been continuously processed and whose first mode identifiers are the first identifier, a number of nodes that have only one child node occupied is greater than a fourth threshold.

It should be noted that, for each to-be-processed node, the first mode identifier of the to-be-processed node is obtained first. If the number of nodes that have been continuously processed and whose mode identifiers are the first identifier is less than the first threshold, the first mode identifier of the next to-be-processed node is not reset, that is, the first mode identifier of the next to-be-processed node is still the first mode identifier of the current to-be-processed node, that is, the first mode identifier of the next to-be-processed node is still the first identifier. Besides, if the number of nodes that have been continuously processed and whose mode identifiers are the first identifier is less than the first threshold, the number of child nodes occupied for each node whose mode identifier is the first identifier needs to be determined, and the number of nodes with only one child node occupied needs to be counted, that is, if a node has only one child node occupied, it is necessary to add 1 for counting. If the number of nodes that have been continuously processed and whose mode identifiers are the first identifier is equal to the first threshold, and among nodes that have been continuously processed and whose first mode identifiers are the first identifier, the number of nodes with only one child node occupied is greater than the fourth threshold, the first mode identifier of the next to-be-processed node needs to be reset. Herein, the implementation method is: first encoding the single point flag corresponding to the current to-be-processed node, then setting the first mode identifier of the next to-be-processed node according to the value of single point flag. Optionally, the application can adopt at least one of the following implementation methods:

A11: in a case that the geometric single point mode identifier indicates that a number of nodes included in the current to-be-processed node is less than or equal to a preset number of points, setting the first mode identifier of the next to-be-processed node as a second identifier.

It should be noted that, single point flag is used to indicate whether to enable single point encoding, for example, when single point flag=1, it means that the single point encoding is enabled; when single point flag=0, it means single point encoding is not enabled; when the to-be-processed node contains one or a small number of points, it means that single point encoding can be performed. The preset number of points mentioned in this application refers to the preset maximum number of points corresponding to enabling of single point encoding; for example, if the preset number of points is 1, it means that the to-be-processed node is a single point (that is, one point), and the single point encoding is enabled, and if the preset number of points is 2, it means that the to-be-processed node is a single point or when the to-be-processed node includes two nodes, the single point code is enabled, and when the current to-be-processed node needs to enable the single point encoding, the first mode identifier of the next to-be-processed node is directly set as the second identifier.

A12: in a case that the geometric single point mode identifier indicates that a number of nodes included in the current to-be-processed node is greater than the preset number of points, setting the first mode identifier of the next to-be-processed node as the first identifier.

It should be noted that, when the nodes to-be-processed contain a large number of points, it means that the single point encoding cannot be performed; when the single point encoding does not need to be enabled, the first mode identifier of the next to-be-processed node is directly set as the first identifier.

It should also be noted that when single point flag is coded, the node needs to be coded based on single point flag instructions, and the implementation process is:

after encoding the geometric single point mode identifier corresponding to the current to-be-processed node, performing a first operation on the current to-be-processed node according to the geometric single point mode identifier;

where the first operation includes: multiway tree occupancy encoding or single point direct encoding.

Optionally, the implementation manner of performing a first operation on the current to-be-processed node according to the geometric single point mode identifier includes at least one of the following:

B11: in a case that the geometric single point mode identifier indicates that the current to-be-processed node is less than or equal to the preset number of points, performing single point direct encoding on the current to-be-processed node.

That is, when single point flag indicates that single point encoding can be enabled, single point direct encoding is performed on the current to-be-processed node.

B12: in a case that the geometric single point mode identifier indicates that a number of nodes included in the current to-be-processed node is greater than the preset number of points, performing multiway tree occupancy encoding on the current to-be-processed node.

That is, when single point flag indicates that single point encoding cannot be enabled, multiway tree occupancy code is performed on the current to-be-processed node.

Optionally, it should also be noted that, among nodes that have been continuously processed and whose first mode identifiers are the first identifier, a number of nodes that have only one child node occupied is less than or equal to a fourth threshold, the embodiment of the present application has the following implementation methods:

in the case that the first mode identifier is the first identifier, if the nodes that have been processed continuously meet a fourth condition, setting the first mode identifier of the next to-be-processed node as the first identifier;

where the fourth condition includes that: the first mode identifier of the node that has been continuously processed is the first identifier, the number of the nodes that have been continuously processed is equal to the first threshold, and among the nodes that have been continuously processed and whose first mode identifiers are the first identifier, the number of nodes that have only one child node occupied is less than or equal to the fourth threshold.

That is, as indicated by the fourth condition, single point flag corresponding to the current to-be-processed node does not need to be coded, the first mode identifier of the next to-be-processed node is directly set as the first identifier, and then multiway tree occupancy encoding is performed on the current to-be-processed node. This method can also reduce the number of single point flags (such as the number of single point flags coded as 0) for which encoding indicates disabling of single point encoding in the process of multiway tree occupancy encoding, thereby improving encoding efficiency.

It should be noted that, in this application, two values of the first mode identifier are set. The above describes how to code when the first mode identifier of the current to-be-processed node is the first identifier. The following describes how to code when the first mode identifier of the current to-be-processed node is the second identifier.

Optionally, after the step 202, the method also includes:

in the case that the first mode identifier is a second identifier, encoding a geometric single point mode identifier corresponding to the current to-be-processed node; and performing a first operation on the current to-be-processed node according to the geometric single point mode identifier;

where the first operation includes: multiway tree occupancy encoding or single point direct encoding.

That is, the first mode identifier of the current to-be-processed node is the second identifier, the single point flag corresponding to the current to-be-processed node is directly coded, and then the node is coded according to the value of the single point flag. Refer to B11 and B12 for the implementation process, which will not be repeated here.

It should also be noted that when single point flag indicates that the single point encoding cannot be enabled, the multiway tree placeholder encoding is directly performed on the current to-be-processed node. When single point flag indicates that single point encoding is enabled, the single point direct encoding is directly performed on the current to-be-processed node. After the single point direct encoding or the multiway tree occupancy encoding, it is necessary to reset the first mode identifier of the next to-be-processed node, optionally, one implementation method is:

if the nodes that have been processed continuously meet a third condition, setting a first mode identifier of a next to-be-processed node according to a number of processed nodes where each node contains points less than or equal to a preset number of points;

where the third condition includes that: a first mode identifier of the node that has been processed continuously is the second identifier and the number of the nodes that have been processed continuously is equal to a second threshold.

It should be noted that, in this case, after performing the single point direct encoding or the multiway tree occupancy encoding on the current to-be-processed node, if the number of nodes that have been continuously processed is less than the second threshold, the next to-be-processed node continues to be processed, without setting the first mode identifier of the next to-be-processed node, the first mode identifier of the next to-be-processed node is still the value of the first mode identifier of the previous node that has been processed, that is, the first mode identifier of the next to-be-processed node is still the second identifier; if the number of nodes that have been processed continuously is equal to the second threshold, it is necessary to determine the number of nodes that enable single point encoding. Optionally, implementations include at least one of the following:

C11: if the number of processed nodes that contain points less than or equal to the preset number of points is greater than a third threshold, setting the first mode identifier of the next to-be-processed node as the second identifier.

It should be noted that, if the number of points contained in a node is less than or equal to the preset number of points, it indicates that the corresponding single point flag of the node indicates that single point encoding needs to be enabled, if the number of points contained in a node is greater than the preset number of points, it indicates that the corresponding single point flag of the node indicates that single point encoding does not need to be enabled That is, in this case, if the number of nodes that enable single point encoding is greater than the third threshold, it indicates that the probability of enabling single point encoding in subsequent nodes is relatively large, and the first mode identifier of the next to-be-processed node is set to be consistent with the first mode identifier of the previous node.

C12: if the number of processed nodes that contain points less than or equal to the preset number of points is less than or equal to the third threshold, setting the first mode identifier of the next to-be-processed node as the first identifier.

That is, in this case, if the number of nodes that enable single point encoding is less than or equal to the third threshold, it indicates that the probability of not enabling single point encoding in subsequent nodes is relatively large, and the first mode identifier of the next to-be-processed node is set as the first identifier.

It needs to be explained that, other nodes except the root node can set first mode identifier in the follow-up process, and in order to accurately process the root node, in the embodiment of this application, the first mode identifier of the root node is set as the second identifier.

Optionally, it should also be noted that the implementation method that can be used for step 202 of this application is:

performing determination of single point encoding condition on the current to-be-processed node; and in a case that the current to-be-processed node meets a single point encoding condition, obtaining the first mode identifier of the current to-be-processed node.

Optionally, the single point encoding condition includes that:

D11: a single point direct encoding mode identifier in geometry header information corresponding to the current to-be-processed node is a preset value.

For example, usually the single point direct encoding mode identifier is represented by 1 bit, and its value is 0 or 1. When 0 is used to indicate that the single point direct encoding is enabled, the preset value is 0, when 1 is used to indicate that single point direct encoding is enabled, the preset value is 1.

D12: the sum of to-be-coded Morton code bits of points in the current to-be-processed node is greater than a preset multiple (for example, twice) of a first value, the first value is a number of first target side lengths in a space block corresponding to the current to-be-processed node, the first target side length includes a side length in a preset direction, and the first target side length is smaller than the minimum side length in the preset direction.

The preset direction here includes at least one of X direction, Y direction or Z direction.

The first threshold, the second threshold, and the third threshold mentioned in the embodiment of this application can be determined by the encoding end or stipulated in the protocol.

For example, when the first threshold is determined by the encoding end, the encoding end can determine the above threshold in the following manner:

E11, the encoding end stores a first threshold set by the user, and directly uses the first threshold when encoding.

E12, there are multiple thresholds set in the encoding end, and the thresholds form a threshold list, and the user can set the threshold used currently.

When the first threshold is determined by the encoding end, the encoding end needs to inform the decoding end of the first threshold used for encoding. Usually, the encoding end needs to code the first threshold into geometric slice header information, and the decoding end directly decodes the geometric slice header information and obtains the first threshold, and decodes according to the same first threshold. when the encoding end adopts the method of E11, usually the first threshold is coded into the geometry header information. When the encoding end adopts the method of E12, usually identifier information corresponding to the first threshold is coded into the geometric slice header information, for example, the identifier information is the number or index of the first threshold in the threshold list, correspondingly, the decoding end is also provided with the same threshold list, and after the decoding end obtains the identifier information, it can know a corresponding threshold in the threshold list.

For example, when the first threshold is stipulated by the protocol, it is agreed that the first threshold is known by both the encoding end and the decoding end. In this case, the encoding end does not need to code the first threshold.

It should be noted that, the first threshold is used as an example, which is also applicable to the second threshold, the third threshold, and the fourth threshold will not be repeated here.

It should be noted that the multiway tree occupancy encoding mentioned in the embodiment of the present application may be a binary tree occupancy encoding, a quadtree occupancy coding, an octree occupancy encoding and other encoding methods.

Taking the octree occupancy encoding is used as an example below, and the implementation process of this application is described as follows.

From the above description, it can be seen that, there are two mode identifiers in the embodiment of this application, one is called mode 0, and corresponds to that the first mode identifier is the second identifier; the other is called mode 1, and corresponds to that the first mode identifier is the first identifier. In mode0, all nodes that pass determining of the single point priori information (in the encoding case, the single point priori information is the single point encoding condition) are coded normally as in the original scheme, but it is necessary to record the number of single point flags that are is 1. However, in mode1, only some nodes that passes determining of single point priori information are coded. In each mode, after completing encoding, a mode that the next node enters is determined according to the encoding result.

In Mode0, two parameters are set: k (It should be noted that the second threshold is equal to k−1) and m (It should be noted that the third threshold is m). k is a number of a set of nodes using mode0, m is a threshold, and whether the number of nodes whose single point flags are 1 among the k nodes is greater than m determines a mode that the next node enters. k nodes determined by the priori information of single points is used as a group, and the encoding methods of these k nodes are the same as the original scheme, that is, single point flag is first coded, the node whose value is 1 is directly coded, and octree occupancy encoding is performed on the node whose value is 0. In this process, the number of nodes where single point flag is 1 among the k nodes needs to be recorded. After k nodes are coded, if the number of nodes whose single point flags are 1 is greater than m, the next node continues to enter mode0; if the number of nodes whose single point flags are 1 is less than or equal to m, then the next node enters mode1.

In mode1, a parameter n is set (It should be noted that, the first threshold is equal to n−1), that is, in mode1, n nodes determined through single point priori information are a group, the first node to the (n−1)-th node directly perform octree encoding, and their octree encoding results are recorded. If the number of nodes that have only one child node occupied is greater than the threshold s in the octree encoding results of n−1 nodes, the n-th node performs normal single point encoding, otherwise the nth node will also directly perform octree encoding. If the n-th node directly performs octree encoding, the next node continues to enter mode1, otherwise a mode that the next node enters is determined based on a single point flag determining result of the n-th node. If a single point flag determining result of the n-th node 1, the next node enters mode0. If the determining result is 0, the next node continues to enter mode1.

In the implementation, two counters are set for mode0: counter K (countK) and counter M (countM) are used to record the number of continuous processing nodes entering mode0 and the number of nodes whose single point flags are 1; two counters are set for mode1: counter N (countN) is used to record the number of continuous processing nodes entering mode1 and the counter S (countS) is used to record the number of nodes that have only one child node occupied. The parameter NextMode is used to indicate the mode adopted by the next node, 0 means choosing mode0, and 1 means choosing mode1. For the root node that codes first, the corresponding parameters are initialized to NextMode=0, countK=0, countM=0, countN=0, and countS=0.

Figure 3:
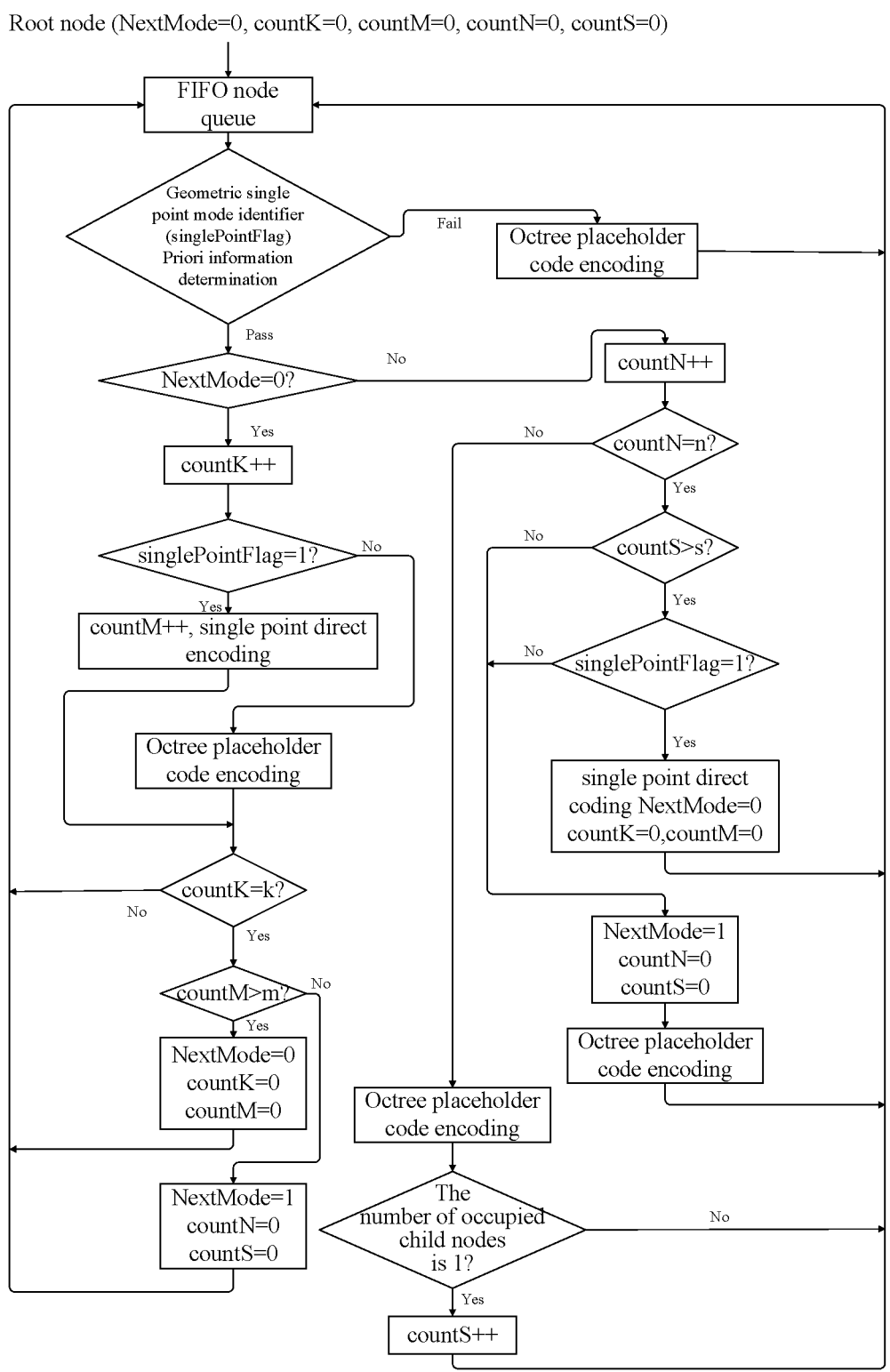
FIG. 3 is a schematic flowchart of encoding according to an embodiment of the present application.

As shown in FIG. 3, the main implementation process of the encoding process is:

For the root node, it is set that NextMode=0, countK=0, countM=0, countN=0, and countS=0. According to the breadth-first and First In First Out (FIFO) principle, a node is selected from the node queue in turn (is called the current to-be-processed node), determining is performed based on single point priori information (single point priori information); if it is determined that it is not passed, octree occupancy encoding is directly performed, and then the next node is selected from the queue for processing; if it is determined that it is passed, the value of NextMode is determined. If NextMode=1, countN adds one, and then it is determined whether the value of countN is equal to n. If it is not equal to n, octree occupancy encoding is directly performed, and the number of nodes that have only one child node occupied is recorded. If the number of nodes that have only one child node occupied is equal to 1, countS adds one, and then the next node is selected from the queue for processing. If it is equal to n, it is first determined whether countS is greater than s, if not, it is set that NextMode=1, countN=0, and countS=0, and the octree occupancy encoding is performed on the current to-be-processed node. If yes, the single point flag of the current to-be-processed node is coded. If single point flag=1, the single point direct encoding is performed on the current to-be-processed node, and it is set that NextMode=0, countK=0, and countM=0. If single point flag=0, it is set that NextMode=1 and countN=0, and octree occupancy encoding is performed on the current to-be-processed node, and then the next node is selected from the queue for processing.

If NextMode=0, countK adds one, and single point flag of the current to-be-processed node is coded. If single point flag=0, octree occupancy encoding is performed on the current to-be-processed node. If single point flag=1, countM adds one, and single point direct encoding is performed on the current to-be-processed node, and it is determined after the octree occupancy encoding or single point direct encoding whether countK is equal to k. If countK is not equal to k, the next node is selected from the queue for processing; if countK is equal to k, it is determined whether countM is greater than m. If countM is greater than m, it is set that NextMode=0, countK=0, and countM=0, the next node continues to be selected from the queue for processing; if countM is less than or equal to m, it is set that NextMode=1, countN=0, and countS=0, the next node continues to be selected from the queue for processing; and so on until all nodes in the queue are coded.

Figure 4:
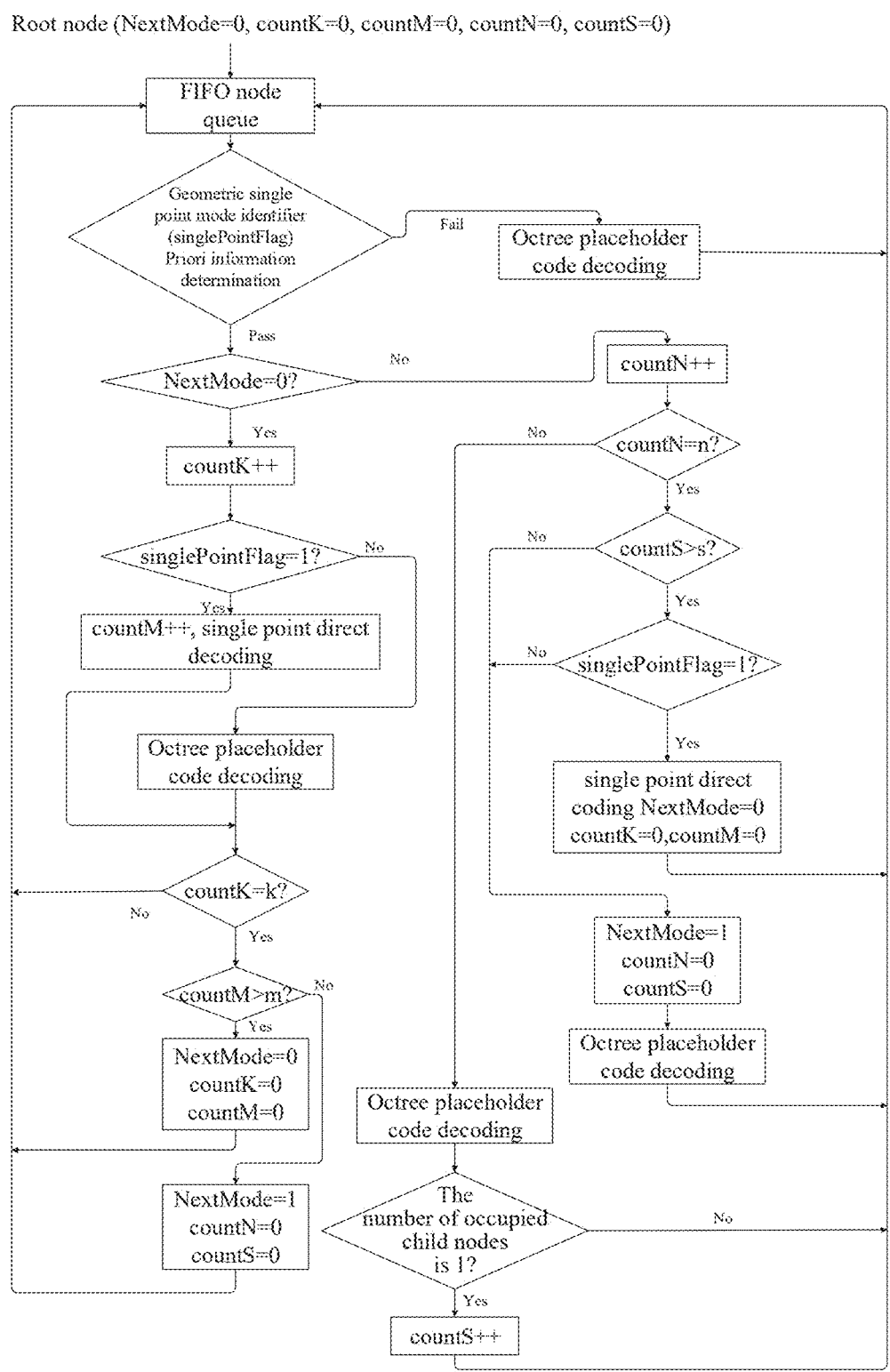
FIG. 4 is a schematic flowchart of decoding according to an embodiment of the present application.

Correspondingly, the decoding end decodes in the same method as the encoding method of the encoding end, and the main implementation process of the decoding control process corresponding to the encoding control method is shown in FIG. 4 below:

For the root node, it is set that NextMode=0, countK=0, countM=0, countN=0, and countS=0. According to FIFO principle, a node is selected from the node queue in turn (is called the current to-be-processed node), determining is performed based on single point priori information (in decoding, the single point priori information is the single point decoding condition); if it is determined that it is not passed, octree occupancy encoding is directly performed, and then the next node is selected from the queue for processing; if it is determined that it is passed, the value of NextMode is determined. If NextMode=1, countN adds one, and then it is determined whether the value of countN is equal to n. If it is not equal to n, octree occupancy encoding is directly performed, and the number of nodes that have only one child node occupied is recorded. If the number of nodes that have only one child node occupied is equal to 1, countS adds one, and then the next node is selected from the queue for processing. If it is equal to n, it is first determined whether countS is greater than S, if not, it is set that NextMode=1, countN=0, and countS=0, and the octree occupancy code decoding is performed on the current to-be-processed node. If yes, the single point flag of the current to-be-processed node is decoded. If single point flag=1, the single point direct decoding is performed on the current to-be-processed node, and it is set that NextMode=0, countK=0, and countM=0. If single point flag=0, it is set that NextMode=1 and countN=0, and octree occupancy code decoding is performed on the current to-be-processed node, and then the next node is selected from the queue for processing.

If NextMode=0, countK adds one, and single point flag of the current to-be-processed node is decoded. If single point flag=0, octree occupancy code decoding is performed on the current to-be-processed node. If single point flag=1, countM adds one, and single point direct decoding is performed on the current to-be-processed node, and it is determined after the octree occupancy code decoding or single point direct decoding whether countK is equal to k. If countK is not equal to k, the next node is selected from the queue for processing; if countK is equal to k, it is determined whether countM is greater than m. If countM is greater than m, it is set that NextMode=0, countK=0, and countM=0, the next node continues to be selected from the queue for processing; if countM is less than or equal to m, it is set that Next-Mode=1, countN=0, and countS=0, the next node continues to be selected from the queue for processing; and so on until all nodes in the queue are decoded.

The encoding control method provided by this application can effectively avoid encoding too many single point flags that are 0 in the code stream, to improve the geometric encoding performance. The experimental results show that using the algorithm described in this technology can improve the encoding performance. As shown in Table 1, under the lossy condition, this scheme has better performance relative to PCRMV3.0.

What needs to be explained here is that there are two aspects to evaluate the performance index of point cloud compression: one is the degree of distortion of the point cloud, the higher the degree of distortion, the worse the objective quality of point cloud reconstruction; the other is bitstream size after compression. For lossless compression, that is, there is no distortion in the point cloud, only the bitstream size after point cloud compression is considered; for lossy compression, both aspects must be considered. In the two aspects, the bitstream size can be measured by the number of bits output after encoding, and for the evaluation of the degree of distortion of the point cloud, PCRM gives two corresponding distortion evaluation algorithms.

Generally speaking, to evaluate the performance of a compression algorithm, usually a rate-distortion (RD) curve is used to compare the performance difference between the two algorithms. The ideal goal of point cloud compression is that the code stream becomes smaller, and the peak signal-to-noise ratio (PSNR) becomes larger. However, this situation rarely occurs. The general situation is that the code stream becomes lower compared to the original method, but PSNR, that is, the quality of the point cloud is reduced, or PSNR becomes higher, but the bitrate goes up. In order to measure the quality of a new method in these two cases, an index that comprehensively considers the code stream and PSNR is needed. AVS point cloud group uses BD-Rate (Bjøntegaard-delta-rate) to comprehensively evaluate the bit rate and objective quality of the point cloud compression algorithm, and refine it into two aspects of geometry and attributes: BD-GeomRate and BD-AttrRate. When BD-Rate is a negative number, it means that the performance of the new method is improved compared to the original method; when BD-Rate is a positive value, it indicates that the performance of the new method is lower than that of the original method. According to whether the error is the mean square error or the Hausdorff distance, there are two ways and results in PSNR calculation, corresponding BD-Rate also has two results, a result obtained in the mean square error calculation is recorded as D1, and a result obtained in hausdorff calculation is recorded as D1-H.

The processor is a processor in the terminal in the foregoing embodiment. The non-transitory readable storage medium includes a non-transitory computer readable storage medium, such as a computer read only memory (ROM), random access Memory (RAM), a magnetic disk, or an optic disc, etc.

TABLE 1

Performance comparison results of this application
and PCRMV3.0 under lossy conditions

| Sequence | BD-GeomRate(D1) | BD-GeomRate(D1 – H) |
|---|---|---|
| bridge__1 mm | −0.3% | −0.3% |
| double__T__section__1 mm | −0.9% | −0.9% |
| intersection1__1 mm | −0.7% | −0.7% |
| intersection2__1 mm | −0.8% | −0.8% |
| straight__road__1 mm | −0.7% | −0.7% |
| T__section__1 mm | −0.5% | −0.5% |
| stanford__area__2__vox20 | −1.1% | −1.1% |
| stanford__area__4__vox20 | −0.9% | −0.9% |
| Church__vox16 | −0.8% | −0.8% |
| Courthouse__vox16 | −0.9% | −0.9% |
| Ignatius__vox11 | −0.4% | −0.4% |
| QQdog__vox15 | −0.8% | −0.8% |
| Truck__vox15 | −0.5% | −0.5% |
| ford__01 | −0.4% | −0.4% |
| ford__02 | −0.3% | −0.3% |
| ford__03 | −0.2% | −0.2% |
| livox__01__all | −0.2% | −0.2% |
| livox__02__all | −0.3% | −0.3% |
| basketball__player__vox11 | −0.8% | −0.8% |
| dancer__player__vox11 | −0.8% | −0.7% |
| exercise__vox11 | −0.5% | −0.4% |
| model__vox11 | −0.6% | −0.6% |

It should be noted that, the encoding control method provided by the embodiment of the present application can be executed by an encoding control apparatus, or a control module in the encoding control apparatus configured to execute the encoding control method. In the embodiment of the present application, the encoding control method executed by the encoding control apparatus is taken as an example, to illustrate the encoding control apparatus provided in the embodiment of the present application.

Figure 5:
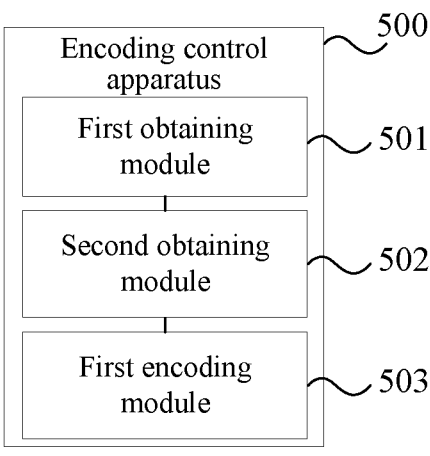
FIG. 5 is a schematic diagram of modules of an encoding control apparatus according to an embodiment of the present application.

As shown in FIG. 5, the embodiment of the present application provides an encoding control apparatus 500, including:

a first obtaining module 501, configured to obtain a current to-be-processed node in a target queue, where the target queue includes nodes whose corresponding space blocks are occupied in a constructed tree structure;

a second obtaining module 502, configured to obtain a first mode identifier of the current to-be-processed node; and a first encoding module 503, configured to: in a case that the first mode identifier is a first identifier, if nodes that have been processed continuously meet a first condition, perform multiway tree occupancy encoding on the current to-be-processed node;

where the first condition includes that: a first mode identifier of the node that has been processed continuously is the first identifier and a number of nodes that have been processed continuously is less than a first threshold.

Optionally, after the second obtaining module 502 obtains the first mode identifier of the current to-be-processed node, the apparatus also includes:

a second encoding module, configured to: in the case that the first mode identifier is the first identifier, if the nodes that have been processed continuously meet a second condition, code a geometric single point mode identifier corresponding to the current to-be-processed node; and a first setting module, configured to set a first mode identifier of a next to-be-processed node according to the geometric single point mode identifier;

where the second condition includes that: a first mode identifier of the node that has been continuously processed is the first identifier, the number of the nodes that have been continuously processed is equal to the first threshold, and among the nodes that have been continuously processed and whose first mode identifiers are the first identifier, a number of nodes that have only one child node occupied is greater than a fourth threshold.

Optionally, the first setting module implements at least one of the following:

in a case that the geometric single point mode identifier indicates that a number of nodes included in the current to-be-processed node is less than or equal to a preset number of points, setting the first mode identifier of the next to-be-processed node as a second identifier; or in a case that the geometric single point mode identifier indicates that a number of nodes included in the current to-be-processed node is greater than the preset number of points, setting the first mode identifier of the next to-be-processed node as the first identifier.

Optionally, after the second encoding module codes the geometric single point mode identifier corresponding to the current to-be-processed node, the apparatus further includes:

a first processing module, configured to perform a first operation on the current to-be-processed node according to the geometric single point mode identifier;

where the first operation includes: multiway tree occupancy encoding or single point direct encoding.

Optionally, after the second obtaining module 502 obtains the first mode identifier of the current to-be-processed node, the apparatus also includes:

a seventh setting module, configured to: in the case that the first mode identifier is the first identifier, if the nodes that have been processed continuously meet a fourth condition, set the first mode identifier of the next to-be-processed node as the first identifier;

where the fourth condition includes that: the first mode identifier of the node that has been continuously processed is the first identifier, the number of the nodes that have been continuously processed is equal to the first threshold, and among the nodes that have been continuously processed and whose first mode identifiers are the first identifier, the number of nodes that have only one child node occupied is less than or equal to the fourth threshold.

Optionally, after the seventh setting module sets the first mode identifier of the next to-be-processed node as the first identifier, the apparatus further includes:

a fourth encoding module, configured to perform multiway tree occupancy encoding on the current to-be-processed node.

Optionally, after the second obtaining module 502 obtains the first mode identifier of the current to-be-processed node, the apparatus also includes:

a third encoding module, configured to: in the case that the first mode identifier is a second identifier, code a geometric single point mode identifier corresponding to the current to-be-processed node; and a second processing module, configured to perform a first operation on the current to-be-processed node according to the geometric single point mode identifier;

where the first operation includes: multiway tree occupancy encoding or single point direct encoding.

Optionally, the implementation manner of performing a first operation on the current to-be-processed node according to the geometric single point mode identifier includes at least one of the following:

in a case that the geometric single point mode identifier indicates that the current to-be-processed node is less than or equal to the preset number of points, performing single point direct encoding on the current to-be-processed node; or in a case that the geometric single point mode identifier indicates that a number of nodes included in the current to-be-processed node is greater than the preset number of points, performing multiway tree occupancy encoding on the current to-be-processed node.

Optionally, after the second processing module performs a first operation on the current to-be-processed node according to the geometric single point mode identifier, the apparatus further includes:

a second setting module, configured to: if the nodes that have been processed continuously meet a third condition, set a first mode identifier of a next to-be-processed node according to a number of processed nodes where each node contains points less than or equal to a preset number of points;

where the third condition includes that: a first mode identifier of the node that has been processed continuously is the second identifier and the number of the nodes that have been processed continuously is equal to a second threshold.

Optionally, the second setting module implements at least one of the following:

if the number of processed nodes that contain points less than or equal to the preset number of points is greater than a third threshold, setting the first mode identifier of the next to-be-processed node as the second identifier; or if the number of processed nodes that contain points less than or equal to the preset number of points is less than or equal to the third threshold, setting the first mode identifier of the next to-be-processed node as the first identifier.

Optionally, before the first obtaining module 501 obtains the current to-be-processed node in the target queue, the apparatus further includes:

a third setting module, configured to: set the first mode identifier of a root node as the second identifier.

Optionally, the second obtaining module 502 includes:

a first determining unit, configured to perform determination of single point encoding condition on the current to-be-processed node; and a first obtaining unit, configured to: in a case that the current to-be-processed node meets a single point encoding condition, obtain the first mode identifier of the current to-be-processed node.

Optionally, the single point encoding condition includes that:

a single point direct encoding mode identifier in geometry header information corresponding to the current to-be-processed node is a preset value; and the sum of to-be-coded Morton code bits of points in the current to-be-processed node is greater than a preset multiple of a first value, the first value is a number of first target side lengths in a space block corresponding to the current to-be-processed node, the first target side length includes a side length in a preset direction, and the first target side length is smaller than the minimum side length in the preset direction.

It should be noted that based on the first mode identifier of the current to-be-processed node, when the first mode identifier is the first identifier, if the mode identifier of the node that has been processed continuously is the first identifier and the number of nodes that have been processed continuously is less than the first threshold, multiway tree occupancy encoding is directly performed on the current to-be-processed node, and there is no need to code single point flag of the current to-be-processed node, which can reduce the encoding of a large number of single point flags that are 0 and thus improve the encoding efficiency.

The encoding control apparatus in the embodiment of the present application may be a device, a device with an operating system or an electronic device, or may be a component, an integrated circuit, or a chip in a terminal. The apparatus or electronic equipment may be a mobile terminal or a non-mobile terminal. Exemplarily, the mobile terminal may include, but is not limited to, a mobile phone, a tablet computer (Tablet Personal Computer), a laptop computer or a notebook computer, a personal digital assistant (PDA), a handheld computer, a netbook, an ultra-mobile personal computer (UMPC), a mobile Internet device (MID), a wearable device or a vehicle-mounted device (VUE), a pedestrian terminal (PUE) and other terminal-side devices. The wearable device includes: smart watches, bracelets, earphones, glasses, and the like. Non-mobile terminals can be servers, network attached storages (NAS), personal computers (PC), televisions (TV), teller machines or self-service machines, and the like. The embodiments of this application do not make limitations.

The encoding control apparatus according to an embodiment of the present disclosure can implement the processes in the method embodiments in FIG. 2, and achieve the same technical effect. To avoid repetition, details are not described herein again.

The embodiment of the present application also provides an encoding control apparatus, including a processor and a communication interface, where the processor is configured to obtain a current to-be-processed node in a target queue the target queue includes nodes whose corresponding space blocks are occupied in a constructed tree structure;

obtain a first mode identifier of the current to-be-processed node; and in a case that the first mode identifier is a first identifier, if nodes that have been processed continuously meet a first condition, perform multiway tree occupancy encoding on the current to-be-processed node;

where the first condition includes that: a mode identifier of the node that has been processed continuously is the first identifier and a number of nodes that have been processed continuously is less than a first threshold.

Figure 6:
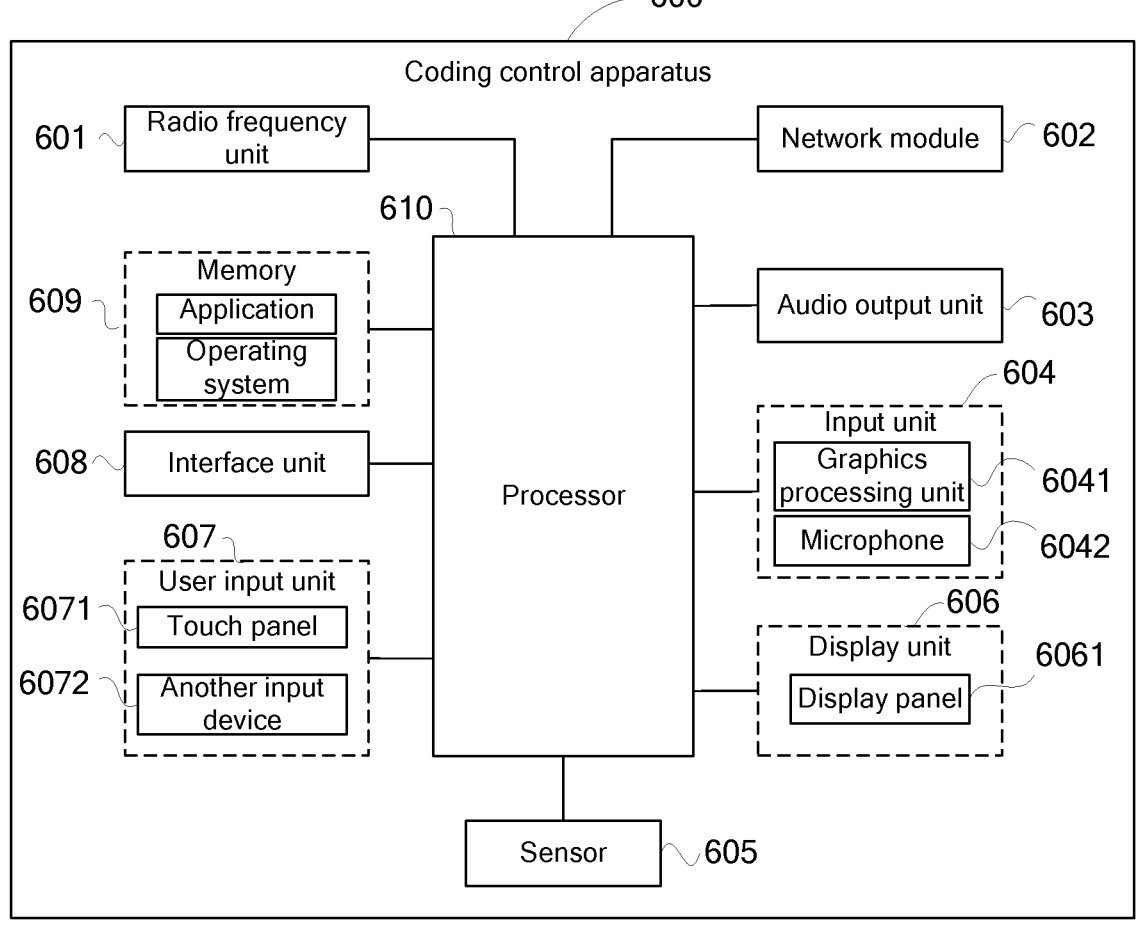
FIG. 6 is a structural block diagram of an encoding control apparatus according to an embodiment of the present application.

This embodiment of the encoding control apparatus corresponds to the above-mentioned method embodiment, and each implementation process and implementation manner of the above-mentioned method embodiment can be applied to this apparatus embodiment, and can achieve the same technical effect. Optionally, FIG. 6 is a schematic diagram of a hardware structure of an encoding control apparatus implementing an embodiment of the present application.

The encoding control apparatus 600 includes, but is not limited to: a radio frequency unit 601, a network module 602, an audio output unit 603, an input unit 604, a sensor 605, a display unit 606, a user input unit 607, an interface unit 608, a memory 609, and a processor 610 and other components.

Those skilled in the art can understand that the encoding control apparatus 600 may further include the power supply (for example, a battery) supplying power to each component. Optionally, the power supply may be logically connected to the processor 610 by using a power management system, so as to implement functions such as charging management, discharging management and power consumption management by using the power management system. The terminal structure shown in FIG. 6 does not constitute any limitation on the terminal, and the terminal may include more or fewer components than those shown in the figure, or combine some components, or have different component arrangements. Details are not described herein.

It should be understood that in the embodiments of this application, the input unit 604 may include a graphics processing unit (GP) 6041 and a microphone 6042, and the graphics processing unit 6041 processes image data of a still picture or video obtained by an image capture apparatus (such as a camera) in a video capture mode or an image capture mode. The display unit 606 may include a display panel 6061. Optionally, the display panel 6061 may be configured in a form such as a liquid crystal display or an organic light-emitting diode. The user input unit 607 includes a touch panel 6071 and another input device 6072. The touch panel 6071 is also referred to as a touchscreen. The touch panel 6071 may include two parts: a touch detection apparatus and a touch controller. The another input device 6072 may include, but is not limited to, a physical keyboard, function keys (such as a volume control key and a switch key), a trackball, a mouse, and a joystick. Details are not described herein.

In this embodiment of this application, the radio frequency unit 601 receives downlink data from a network side device and then sends the downlink data to the processor 610 for processing; and sends uplink data to the network side device. Usually, the radio frequency unit 601 includes but is not limited to an antenna, at least one amplifier, a transceiver, a coupler, a low noise amplifier, a duplexer, and the like.

The memory 609 may be configured to store a software program or an instruction and various data. The memory 609 may mainly include a program or instruction storage area and a data storage area, where the program or instruction storage area may store an operating system, an application program or instructions required by at least one function (such as a sound playback function, an image playback function, etc.) and the like. In addition, the memory 609 may include a high-speed random access memory and non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory, for example, at least one disk storage component, a flash memory component, or another non-volatile solid-state storage component.

The processor 610 may include one or more processing units. Optionally, the processor 610 may be integrated with an application processor and a modem processor. The application processor mainly processes the operating system, the user interface, and applications or instructions. The modem processor mainly processes wireless communication such as a baseband processor. It can be understood that, alternatively, the modem processor may not be integrated into the processor 610.

The processor 610 is configured to implement: obtaining a current to-be-processed node in a target queue, where the target queue includes nodes whose corresponding space blocks are occupied in a constructed tree structure;

obtaining a first mode identifier of the current to-be-processed node; and in a case that the first mode identifier is a first identifier, if nodes that have been processed continuously meet a first condition, performing multiway tree occupancy encoding on the current to-be-processed node;

where the first condition includes that: a mode identifier of the node that has been processed continuously is the first identifier and a number of nodes that have been processed continuously is less than a first threshold.

In the embodiment of this application, based on the first mode identifier of the current to-be-processed node, when the first mode identifier is the first identifier, if the mode identifier of the node that has been processed continuously is the first identifier and the number of nodes that have been processed continuously is less than the first threshold, encoding control apparatus directly performs multiway tree occupancy encoding on the current to-be-processed node, and there is no need to code single point flag of the current to-be-processed node, which can reduce the encoding of a large number of single point flags that are 0 and thus improve the encoding efficiency.

Optionally, after the obtaining the first mode identifier of the current to-be-processed node, the processor 610 is further configured to implement:

in the case that the first mode identifier is the first identifier, if the nodes that have been processed continuously meet a second condition, encoding a geometric single point mode identifier corresponding to the current to-be-processed node; and setting a first mode identifier of a next to-be-processed node according to the geometric single point mode identifier;

where the second condition includes that: a first mode identifier of the node that has been continuously processed is the first identifier, the number of the nodes that have been continuously processed is equal to the first threshold, and among the nodes that have been continuously processed and whose first mode identifiers are the first identifier, a number of nodes that have only one child node occupied is greater than a fourth threshold.

Optionally, the processor 610 is configured to implement at least one of the following:

in a case that the geometric single point mode identifier indicates that a number of nodes included in the current to-be-processed node is less than or equal to a preset number of points, setting the first mode identifier of the next to-be-processed node as a second identifier; or in a case that the geometric single point mode identifier indicates that a number of nodes included in the current to-be-processed node is greater than the preset number of points, setting the first mode identifier of the next to-be-processed node as the first identifier.

Optionally, after encoding the geometric single point mode identifier corresponding to the current to-be-processed node, the processor 610 is further configured to implement:

performing a first operation on the current to-be-processed node according to the geometric single point mode identifier;

where the first operation includes: multiway tree occupancy encoding or single point direct encoding.

Optionally, after the obtaining the first mode identifier of the current to-be-processed node, the processor 610 is further configured to implement:

in the case that the first mode identifier is the first identifier, if the nodes that have been processed continuously meet a fourth condition, setting the first mode identifier of the next to-be-processed node as the first identifier;

where the fourth condition includes that: the first mode identifier of the node that has been continuously processed is the first identifier, the number of the nodes that have been continuously processed is equal to the first threshold, and among the nodes that have been continuously processed and whose first mode identifiers are the first identifier, the number of nodes that have only one child node occupied is less than or equal to the fourth threshold.

Optionally, the processor 610 is also configured to implement:

performing multiway tree occupancy encoding on the current to-be-processed node.

Optionally, after the obtaining the first mode identifier of the current to-be-processed node, the processor 610 is further configured to implement:

in the case that the first mode identifier is a second identifier, encoding a geometric single point mode identifier corresponding to the current to-be-processed node; and performing a first operation on the current to-be-processed node according to the geometric single point mode identifier;

where the first operation includes: multiway tree occupancy encoding or single point direct encoding.

Optionally, the processor 610 is configured to implement at least one of the following:

in a case that the geometric single point mode identifier indicates that the current to-be-processed node is less than or equal to the preset number of points, performing single point direct encoding on the current to-be-processed node; or in a case that the geometric single point mode identifier indicates that a number of nodes included in the current to-be-processed node is greater than the preset number of points, performing multiway tree occupancy encoding on the current to-be-processed node.

Optionally, in the case that the first mode identifier is a second identifier, after the processor 610 performs the first operation on the current to-be-processed node according to the geometric single point mode identifier, the processor 610 is also configured to implement:

if the nodes that have been processed continuously meet a third condition, setting a first mode identifier of a next to-be-processed node according to a number of processed nodes where each node contains points less than or equal to a preset number of points;

where the third condition includes that: a first mode identifier of the node that has been processed continuously is the second identifier and the number of the nodes that have been processed continuously is equal to a second threshold.

Optionally, the processor 610 is configured to implement at least one of the following:

if the number of processed nodes that contain points less than or equal to the preset number of points is greater than a third threshold, setting the first mode identifier of the next to-be-processed node as the second identifier; or if the number of processed nodes that contain points less than or equal to the preset number of points is less than or equal to the third threshold, setting the first mode identifier of the next to-be-processed node as the first identifier.

Optionally, before obtaining the current to-be-processed node in the target queue, the processor 610 is further configured to implement:

setting the first mode identifier of a root node as the second identifier.

Optionally, the processor 610 is configured to implement:

performing determination of single point encoding condition on the current to-be-processed node; and in a case that the current to-be-processed node meets a single point encoding condition, obtaining the first mode identifier of the current to-be-processed node.

Optionally, the single point encoding condition includes that:

a single point direct encoding mode identifier in geometry header information corresponding to the current to-be-processed node is a preset value; and the sum of to-be-coded Morton code bits of points in the current to-be-processed node is greater than a preset multiple of a first value, the first value is a number of first target side lengths in a space block corresponding to the current to-be-processed node, the first target side length includes a side length in a preset direction, and the first target side length is smaller than the minimum side length in the preset direction.

Optionally, an embodiment of the present application further provides an encoding control apparatus, including a processor, a memory, and a program or an instruction stored in the memory and executable on the processor. When the program or instruction is executed by the processor, each process of the embodiment of the foregoing encoding control method, and the same technical effect can be achieved. To avoid repetition, details are not repeated herein.

An embodiment of the present application further provides a non-transitory readable storage medium. The non-transitory readable storage medium stores a program or an instruction, and when the program or the instruction is executed by a processor, the various processes of the foregoing encoding control method embodiment is performed and the same technical effects can be achieved. To avoid repetition, details are not described herein again. The non-transitory readable storage medium includes a non-transitory computer readable storage medium, for example, a read-only memory (ROM), a random access memory (RAM), a magnetic disk, or an optical disc.

As shown in FIG. 7, this embodiment of the present application further provides a decoding control method, including:

Step 701: Obtain a current to-be-processed node in a target queue, where the target queue includes nodes whose corresponding space blocks are occupied in a constructed tree structure.

Step 702: Obtain a first mode identifier of the current to-be-processed node.

Step 703: In a case that the first mode identifier is a first identifier, if nodes that have been processed continuously meet a first condition, perform multiway tree occupancy code decoding on the current to-be-processed node.

The first condition includes that: a mode identifier of the node that has been processed continuously is the first identifier and a number of nodes that have been processed continuously is less than a first threshold.

Optionally, after obtaining the first mode identifier of the current to-be-processed node, the method also includes:

in the case that the first mode identifier is the first identifier, if the nodes that have been processed continuously meet a second condition, decoding a geometric single point mode identifier corresponding to the current to-be-processed node; and setting a first mode identifier of a next to-be-processed node according to the geometric single point mode identifier;

where the second condition includes that: a first mode identifier of the node that has been continuously processed is the first identifier, the number of the nodes that have been continuously processed is equal to the first threshold, and among the nodes that have been continuously processed and whose first mode identifiers are the first identifier, a number of nodes that have only one child node occupied is greater than a fourth threshold.

Optionally, the setting a first mode identifier of a next to-be-processed node according to the geometric single point mode identifier includes at least one of the following:

in a case that the geometric single point mode identifier indicates that a number of nodes included in the current to-be-processed node is less than or equal to a preset number of points, setting the first mode identifier of the next to-be-processed node as a second identifier; or in a case that the geometric single point mode identifier indicates that a number of nodes included in the current to-be-processed node is greater than the preset number of points, setting the first mode identifier of the next to-be-processed node as the first identifier.

Optionally, after decoding the geometric single point mode identifier corresponding to the current to-be-processed node, the method further includes:

performing a second operation on the current to-be-processed node according to the geometric single point mode identifier;

where the second operation includes: multiway tree occupancy code decoding or single point direct decoding.

Optionally, after obtaining the first mode identifier of the current to-be-processed node, the method also includes:

in the case that the first mode identifier is the first identifier, if the nodes that have been processed continuously meet a fourth condition, setting the first mode identifier of the next to-be-processed node as the first identifier;

where the fourth condition includes that: the first mode identifier of the node that has been continuously processed is the first identifier, the number of the nodes that have been continuously processed is equal to the first threshold, and among the nodes that have been continuously processed and whose first mode identifiers are the first identifier, the number of nodes that have only one child node occupied is less than or equal to the fourth threshold.

Optionally, after setting the first mode identifier of the next to-be-processed node as the first identifier, the method further includes:

performing multiway tree occupancy code decoding on the current to-be-processed node.

Optionally, after obtaining the first mode identifier of the current to-be-processed node, the method also includes:

in the case that the first mode identifier is a second identifier, decoding a geometric single point mode identifier corresponding to the current to-be-processed node; and performing a second operation on the current to-be-processed node according to the geometric single point mode identifier;

where the second operation includes: multiway tree occupancy code decoding or single point direct decoding.

Optionally, the performing a second operation on the current to-be-processed node according to the geometric single point mode identifier includes at least one of the following:

in a case that the geometric single point mode identifier indicates that the current to-be-processed node is less than or equal to the preset number of points, performing single point direct decoding on the current to-be-processed node; or in a case that the geometric single point mode identifier indicates that a number of nodes included in the current to-be-processed node is greater than the preset number of points, performing multiway tree occupancy code decoding on the current to-be-processed node.

Optionally, in the case that the first mode identifier is a second identifier, after performing the second operation on the current to-be-processed node according to the geometric single point mode identifier, the method further includes:

if the nodes that have been processed continuously meet a third condition, setting a first mode identifier of a next to-be-processed node according to a number of processed nodes where each node contains points less than or equal to a preset number of points;

where the third condition includes that: a first mode identifier of the node that has been processed continuously is the second identifier and the number of the nodes that have been processed continuously is equal to a second threshold.

Optionally, the setting the first mode identifier of the next to-be-processed node according to a number of processed nodes where each node contains points less than or equal to the preset number of points includes at least one of the following:

if the number of processed nodes that contain points less than or equal to the preset number of points is greater than a third threshold, setting the first mode identifier of the next to-be-processed node as the second identifier; or if the number of processed nodes that contain points less than or equal to the preset number of points is less than or equal to the third threshold, setting the first mode identifier of the next to-be-processed node as the first identifier.

Optionally, before obtaining the current to-be-processed node in the target queue, the method further includes:

setting the first mode identifier of a root node as the second identifier.

Optionally, the obtaining the first mode identifier of the current to-be-processed node includes:

performing determination of single point decoding condition on the current to-be-processed node; and in a case that the current to-be-processed node meets a single point decoding condition, obtaining the first mode identifier of the current to-be-processed node.

Optionally, the single point decoding condition includes:

a single point direct encoding mode identifier in geometry header information corresponding to the current to-be-processed node is a preset value; and the sum of to-be-coded Morton code bits of points in the current to-be-processed node is greater than a preset multiple of a first value, the first value is a number of first target side lengths in a space block corresponding to the current to-be-processed node, the first target side length includes a side length in a preset direction, and the first target side length is smaller than the minimum side length in the preset direction.

It should be noted that the decoding end also decodes in the same method as the encoding method of the encoding end, and the implementation method for the decoding end can be found in the decoding end, which will not be discussed here.

As shown in FIG. 8, the embodiment of the present application also provides a decoding control apparatus 800, including:

a third obtaining module 801, configured to obtain a current to-be-processed node in a target queue, where the target queue includes nodes whose corresponding space blocks are occupied in a constructed tree structure;

a fourth obtaining module 802, configured to obtain a first mode identifier of the current to-be-processed node; and a first decoding module 803, configured to: in a case that the first mode identifier is a first identifier, if nodes that have been processed continuously meet a first condition, perform multiway tree occupancy code decoding on the current to-be-processed node.

The first condition includes that: a mode identifier of the node that has been processed continuously is the first identifier and a number of nodes that have been processed continuously is less than a first threshold.

Optionally, after the fourth obtaining module 802 obtains the first mode identifier of the current to-be-processed node, the apparatus also includes:

a second decoding module, configured to: in the case that the first mode identifier is the first identifier, if the nodes that have been processed continuously meet a second condition, decode a geometric single point mode identifier corresponding to the current to-be-processed node; and a fourth setting module, configured to set a first mode identifier of a next to-be-processed node according to the geometric single point mode identifier;

where the second condition includes that: a first mode identifier of the node that has been continuously processed is the first identifier, the number of the nodes that have been continuously processed is equal to the first threshold, and among the nodes that have been continuously processed and whose first mode identifiers are the first identifier, a number of nodes that have only one child node occupied is greater than a fourth threshold.

Optionally, the fourth setting module implements at least one of the following:

in a case that the geometric single point mode identifier indicates that a number of nodes included in the current to-be-processed node is less than or equal to a preset number of points, setting the first mode identifier of the next to-be-processed node as a second identifier; or in a case that the geometric single point mode identifier indicates that a number of nodes included in the current to-be-processed node is greater than the preset number of points, setting the first mode identifier of the next to-be-processed node as the first identifier.

Optionally, after the second decoding module decodes the geometric single point mode identifier corresponding to the current to-be-processed node, the apparatus further includes:

a third processing module, configured to perform a second operation on the current to-be-processed node according to the geometric single point mode identifier;

where the second operation includes: multiway tree occupancy code decoding or single point direct decoding.

Optionally, after the fourth obtaining module 802 obtains the first mode identifier of the current to-be-processed node, the apparatus also includes:

an eighth setting module, configured to: in the case that the first mode identifier is the first identifier, if the nodes that have been processed continuously meet a fourth condition, set the first mode identifier of the next to-be-processed node as the first identifier;

where the fourth condition includes that: the first mode identifier of the node that has been continuously processed is the first identifier, the number of the nodes that have been continuously processed is equal to the first threshold, and among the nodes that have been continuously processed and whose first mode identifiers are the first identifier, the number of nodes that have only one child node occupied is less than or equal to the fourth threshold.

Optionally, after the eighth setting module sets the first mode identifier of the next to-be-processed node as the first identifier, the apparatus further includes:

a fourth decoding module, configured to perform multiway tree occupancy code decoding on the current to-be-processed node.

Optionally, after the fourth obtaining module 802 obtains the first mode identifier of the current to-be-processed node, the apparatus also includes:

a third decoding module, configured to: in the case that the first mode identifier is a second identifier, decode a geometric single point mode identifier corresponding to the current to-be-processed node; and a fourth processing module, configured to perform a second operation on the current to-be-processed node according to the geometric single point mode identifier;

where the second operation includes: multiway tree occupancy code decoding or single point direct decoding.

Optionally, the implementation manner of performing a second operation on the current to-be-processed node according to the geometric single point mode identifier includes at least one of the following:

in a case that the geometric single point mode identifier indicates that the current to-be-processed node is less than or equal to the preset number of points, performing single point direct decoding on the current to-be-processed node; or in a case that the geometric single point mode identifier indicates that a number of nodes included in the current to-be-processed node is greater than the preset number of points, performing multiway tree occupancy code decoding on the current to-be-processed node.

Optionally, after the fourth processing module performs a second operation on the current to-be-processed node according to the geometric single point mode identifier; the apparatus further includes:

a fifth setting module, configured to: if the nodes that have been processed continuously meet a third condition, set a first mode identifier of a next to-be-processed node according to a number of processed nodes where each node contains points less than or equal to a preset number of points;

where the third condition includes that: a first mode identifier of the node that has been processed continuously is the second identifier and the number of the nodes that have been processed continuously is equal to a second threshold.

Optionally, the fifth setting module implements at least one of the following:

if the number of processed nodes that contain points less than or equal to the preset number of points is greater than a third threshold, setting the first mode identifier of the next to-be-processed node as the second identifier; or if the number of processed nodes that contain points less than or equal to the preset number of points is less than or equal to the third threshold, setting the first mode identifier of the next to-be-processed node as the first identifier.

Optionally, before obtaining the current to-be-processed node in the target queue, the method further includes:

a sixth setting module, configured to: set the first mode identifier of a root node as the second identifier.

Optionally, the fourth obtaining module 802 includes:

a second determining unit, configured to perform determination of single point decoding condition on the current to-be-processed node; and a second obtaining unit, configured to: in a case that the current to-be-processed node meets a single point decoding condition, obtain the first mode identifier of the current to-be-processed node.

Optionally, the single point decoding condition includes:

a single point direct encoding mode identifier in geometry header information corresponding to the current to-be-processed node is a preset value; and the sum of to-be-coded Morton code bits of points in the current to-be-processed node is greater than a preset multiple of a first value, the first value is a number of first target side lengths in a space block corresponding to the current to-be-processed node, the first target side length includes a side length in a preset direction, and the first target side length is smaller than the minimum side length in the preset direction.

It should be noted that, this apparatus embodiment is an apparatus corresponding to the above-mentioned method, all the implementation modes in the above-mentioned embodiment are applicable to this apparatus embodiment, and the same technical effect can also be achieved. This will not be repeated here.

Optionally, an embodiment of the present application further provides a decoding control apparatus, including a processor, a memory, and a program or an instruction stored in the memory and executable on the processor. When the program or instruction is executed by the processor, each process of the embodiment of the foregoing decoding control method, and the same technical effect can be achieved. To avoid repetition, details are not repeated herein.

An embodiment of the present application further provides a non-transitory readable storage medium. The non-transitory computer readable storage medium stores a program or an instruction, and when the program or the instruction is executed by a processor, the various processes of the foregoing decoding control method embodiment is performed and the same technical effects can be achieved. To avoid repetition, details are not described herein again.

The non-transitory computer readable storage medium is, for example, a read-only memory (ROM), a random access memory (RAM), a magnetic disk, or an optical disc.

The embodiment of the present application also provides a decoding control apparatus, including a processor and a communication interface, where the processor is configured to obtain a current to-be-processed node in a target queue the target queue includes nodes whose corresponding space blocks are occupied in a constructed tree structure;

obtain a first mode identifier of the current to-be-processed node; and in a case that the first mode identifier is a first identifier, if nodes that have been processed continuously meet a first condition, perform multiway tree occupancy code decoding on the current to-be-processed node.

The first condition includes that: a mode identifier of the node that has been processed continuously is the first identifier and a number of nodes that have been processed continuously is less than a first threshold.

This embodiment of the decoding control apparatus corresponds to the above-mentioned decoding control method embodiment, and each implementation process and implementation manner of the above-mentioned method embodiment can be applied to this decoding control apparatus embodiment, and can achieve the same technical effect.

Optionally, the embodiment of this application also provides a decoding control apparatus. For example, the structure of the decoding control apparatus is the same as that shown in FIG. 6 and will not be repeated here.

Optionally, the processor is configured to implement:

obtaining a current to-be-processed node in a target queue, where the target queue includes nodes whose corresponding space blocks are occupied in a constructed tree structure;

obtaining a first mode identifier of the current to-be-processed node; and in a case that the first mode identifier is a first identifier, if nodes that have been processed continuously meet a first condition, performing multiway tree occupancy code decoding on the current to-be-processed node.

The first condition includes that: a mode identifier of the node that has been processed continuously is the first identifier and a number of nodes that have been processed continuously is less than a first threshold.

Optionally, after the obtaining the first mode identifier of the current to-be-processed node, the processor is further configured to implement:

in the case that the first mode identifier is the first identifier, if the nodes that have been processed continuously meet a second condition, decoding a geometric single point mode identifier corresponding to the current to-be-processed node; and setting a first mode identifier of a next to-be-processed node according to the geometric single point mode identifier;

where the second condition includes that: a first mode identifier of the node that has been continuously processed is the first identifier, the number of the nodes that have been continuously processed is equal to the first threshold, and among the nodes that have been continuously processed and whose first mode identifiers are the first identifier, a number of nodes that have only one child node occupied is greater than a fourth threshold.

Optionally, the processor is configured to implement at least one of the following:

in a case that the geometric single point mode identifier indicates that a number of nodes included in the current to-be-processed node is less than or equal to a preset number of points, setting the first mode identifier of the next to-be-processed node as a second identifier; or in a case that the geometric single point mode identifier indicates that a number of nodes included in the current to-be-processed node is greater than the preset number of points, setting the first mode identifier of the next to-be-processed node as the first identifier.

Optionally, after decoding the geometric single point mode identifier corresponding to the current to-be-processed node, the processor is further configured to implement:

performing a second operation on the current to-be-processed node according to the geometric single point mode identifier;

where the second operation includes: multiway tree occupancy code decoding or single point direct decoding.

Optionally, after the obtaining the first mode identifier of the current to-be-processed node, the processor is further configured to implement:

in the case that the first mode identifier is the first identifier, if the nodes that have been processed continuously meet a fourth condition, setting the first mode identifier of the next to-be-processed node as the first identifier;

where the fourth condition includes that: the first mode identifier of the node that has been continuously processed is the first identifier, the number of the nodes that have been continuously processed is equal to the first threshold, and among the nodes that have been continuously processed and whose first mode identifiers are the first identifier, the number of nodes that have only one child node occupied is less than or equal to the fourth threshold.

Optionally, after setting the first mode identifier of the next to-be-processed node as the first mode identifier, the processor is also configured to implement:

performing multiway tree occupancy code decoding on the current to-be-processed node.

Optionally, after the obtaining the first mode identifier of the current to-be-processed node, the processor is further configured to implement:

in the case that the first mode identifier is a second identifier, decoding a geometric single point mode identifier corresponding to the current to-be-processed node; and performing a second operation on the current to-be-processed node according to the geometric single point mode identifier;

where the second operation includes: multiway tree occupancy code decoding or single point direct decoding.

Optionally, the processor is configured to implement at least one of the following:

in a case that the geometric single point mode identifier indicates that the current to-be-processed node is less than or equal to the preset number of points, performing single point direct decoding on the current to-be-processed node; or in a case that the geometric single point mode identifier indicates that a number of nodes included in the current to-be-processed node is greater than the preset number of points, performing multiway tree occupancy code decoding on the current to-be-processed node.

Optionally, in the case that the first mode identifier is a second identifier, after the processor performs the second operation on the current to-be-processed node according to the geometric single point mode identifier, the processor is also configured to implement:

if the nodes that have been processed continuously meet a third condition, setting a first mode identifier of a next to-be-processed node according to a number of processed nodes where each node contains points less than or equal to a preset number of points;

where the third condition includes that: a first mode identifier of the node that has been processed continuously is the second identifier and the number of the nodes that have been processed continuously is equal to a second threshold.

Optionally, the processor is configured to implement:

if the number of processed nodes that contain points less than or equal to the preset number of points is greater than a third threshold, setting the first mode identifier of the next to-be-processed node as the second identifier; and if the number of processed nodes that contain points less than or equal to the preset number of points is less than or equal to the third threshold, setting the first mode identifier of the next to-be-processed node as the first identifier.

Optionally, before obtaining the current to-be-processed node in the target queue, the processor is further configured to implement:

setting the first mode identifier of a root node as the second identifier.

Optionally, the processor is configured to implement:

performing determination of single point decoding condition on the current to-be-processed node; and in a case that the current to-be-processed node meets a single point decoding condition, obtaining the first mode identifier of the current to-be-processed node.

Optionally, the single point decoding condition includes:

a single point direct encoding mode identifier in geometry header information corresponding to the current to-be-processed node is a preset value; and the sum of to-be-coded Morton code bits of points in the current to-be-processed node is greater than a preset multiple of a first value, the first value is a number of first target side lengths in a space block corresponding to the current to-be-processed node, the first target side length includes a side length in a preset direction, and the first target side length is smaller than the minimum side length in the preset direction.

It should be noted that the encoding control apparatus and decoding control apparatus mentioned in the embodiment of the present application can be set in the same device, that is, the device can realize both the encoding control function and the decoding control function.

Figure 9:
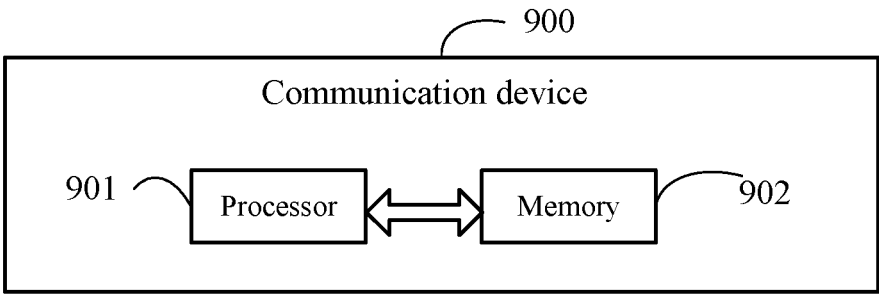
FIG. 9 is a structural block diagram of a communication device according to an embodiment of the present application.

Optionally, as shown in FIG. 9, an embodiment of the present application further provides a communication device 900, including a processor 901, a memory 902, and a program or an instruction stored in the memory 902 and executable on the processor 901. For example, when the communication device 900 is an encoding control apparatus, when the program or instruction is executed by the processor 901, each process of the embodiment of the foregoing encoding control method is performed, and the same technical effect can be achieved. When the communication device 900 is a decoding control apparatus, when the program or instruction is executed by the processor 901, each process of the above embodiment of the decoding control method can be achieved and the same technical effect can be achieved. To avoid repetition, details are not described herein.

An embodiment of the present application further provides a chip, the chip includes a processor and a communication interface, the communication interface is coupled to the processor, and the processor is configured to run programs or instructions to implement each process of the embodiment of the foregoing encoding control method or decoding control method and the same technical effects can be achieved. To avoid repetition, details are not described herein again.

It should be understood that the chips mentioned in the embodiments of the present application may also be called a system-level chip, a system chip, a chip system, or a system-on-chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be pointed out that the scope of the methods and devices in the embodiments of the present application is not limited to performing functions in the order shown or discussed, and may also include performing functions in a substantially simultaneous manner or in a reverse order according to the functions involved, for example, the described methods may be performed in an order different from that described, and various steps may also be added, omitted, or combined. In addition, features described with reference to some examples may be combined in other examples.

According to the foregoing descriptions of the implementations, a person skilled in the art may clearly understand that the foregoing method embodiments may be implemented by using software and a required universal hardware platform, or certainly may be implemented by using hardware. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. An encoding control method, comprising:
obtaining a current to-be-encoded node in a target queue, wherein the target queue comprises nodes whose corresponding space blocks are occupied in a constructed tree structure;
obtaining a first mode identifier of the current to-be-encoded node, wherein the first mode identifier is used to indicate whether to encode geometric single point mode identifiers for a part of nodes that meet a priori condition of a single point encoding mode, wherein a geometric single point mode identifier is used to indicate whether to enable single point encoding; and
in a case that the first mode identifier of the current to-be-encoded node is a first identifier, if nodes that have been encoded meet a first condition, directly performing octree encoding on the current to-be-encoded node, wherein the first identifier is used to indicate to encode the geometric single point mode identifiers for the part of nodes that meet the priori condition of the single point encoding mode;
wherein nodes in the constructed tree structure are encoded in a given order, and the first condition comprises that: a number of nodes that have been performed octree encoding and whose corresponding first mode identifiers are first identifiers is less than a first threshold.

2. The method according to claim 1, after the obtaining the first mode identifier of the current to-be-encoded node, further comprising:
in the case that the first mode identifier is the first identifier, if the nodes that have been encoded meet a second condition, encoding a geometric single point mode identifier corresponding to the current to-be-encoded node; and
setting a first mode identifier of a next to-be-encoded node according to the geometric single point mode identifier;
wherein the second condition comprises that: the number of the nodes that have been performed octree encoding and whose corresponding first mode identifiers are the first identifiers is equal to the first threshold, and among the nodes that have been performed octree encoding and whose corresponding first mode identifiers are the first identifiers, a number of nodes that have only one child node occupied is greater than a fourth threshold.

3. The method according to claim 2, wherein the setting the first mode identifier of the next to-be-encoded node according to the geometric single point mode identifier comprises at least one of:
in a case that the geometric single point mode identifier indicates that a number of points included in the current to-be-encoded node is less than or equal to a preset number of points, setting the first mode identifier of the next to-be-encoded node as a second identifier; or
in a case that the geometric single point mode identifier indicates that the number of points included in the current to-be-encoded node is greater than the preset number of points, setting the first mode identifier of the next to-be-encoded node as the first identifier.

4. The method according to claim 2, after the encoding the geometric single point mode identifier corresponding to the current to-be-encoded node, further comprising:
performing a first operation on the current to-be-encoded node according to the geometric single point mode identifier;
wherein the first operation comprises: octree encoding or single point direct encoding;
or,
after the obtaining the first mode identifier of the current to-be-encoded node, further comprising:
in the case that the first mode identifier is the first identifier, if the nodes that have been encoded meet a fourth condition, setting the first mode identifier of the next to-be-encoded node as the first identifier;
wherein the fourth condition comprises that: the number of the nodes that have been performed octree encoding and whose corresponding first mode identifiers are the first identifiers is equal to the first threshold, and among the nodes that have been performed octree encoding and whose corresponding first mode identifiers are the first identifiers, the number of nodes that have only one child node occupied is less than or equal to the fourth threshold;

after the setting the first mode identifier of the next to-be-encoded node as the first identifier, further comprising:

performing octree encoding on the current to-be-encoded node.

5. The method according to claim 1, after the obtaining the first mode identifier of the current to-be-encoded node, further comprising:

in a case that the first mode identifier is a second identifier, encoding a geometric single point mode identifier corresponding to the current to-be-encoded node; and performing a first operation on the current to-be-encoded node according to the geometric single point mode identifier;

wherein the first operation comprises: octree encoding or single point direct encoding.

6. The method according to claim 5, wherein the performing the first operation on the current to-be-encoded node according to the geometric single point mode identifier comprises at least one of:

in a case that the geometric single point mode identifier indicates that a number of points included in the current to-be-encoded node is less than or equal to a preset number of points, performing single point direct encoding on the current to-be-encoded node; or in a case that the geometric single point mode identifier indicates that the number of points included in the current to-be-encoded node is greater than the preset number of points, performing octree encoding on the current to-be-encoded node.

7. The method according to claim 5, after the performing the first operation on the current to-be-encoded node according to the geometric single point mode identifier, further comprising:

if the nodes that have been encoded meet a third condition, setting a first mode identifier of a next to-be-encoded node according to a number of encoded nodes where each node contains points less than or equal to a preset number of points;

wherein the third condition comprises that: the number of the nodes that have been performed octree encoding and whose corresponding first mode identifiers are second identifiers is equal to a second threshold;

wherein the setting the first mode identifier of the next to-be-encoded node according to the number of encoded nodes where each node contains points less than or equal to the preset number of points comprises at least one of:

if the number of encoded nodes that contain points less than or equal to the preset number of points is greater than a third threshold, setting the first mode identifier of the next to-be-encoded node as the second identifier; or if the number of encoded nodes that contain points less than or equal to the preset number of points is less than or equal to the third threshold, setting the first mode identifier of the next to-be-encoded node as the first identifier.

8. The method according to claim 1, before the obtaining the current to-be-encoded node in the target queue, further comprising:

setting a first mode identifier of a root node as a second identifier.

9. The method according to claim 1, wherein the obtaining the first mode identifier of the current to-be-encoded node comprises:

performing determination of the priori condition of the single point encoding mode on the current to-be-encoded node; and in a case that the current to-be-encoded node meets the priori condition of the single point encoding mode, obtaining the first mode identifier of the current to-be-encoded node.

10. A decoding control method, comprising:

obtaining a current to-be-decoded node in a target queue, wherein the target queue comprises nodes whose corresponding space blocks are occupied in a constructed tree structure;

obtaining a first mode identifier of the current to-be-decoded node, wherein the first mode identifier is used to indicate whether to decode geometric single point mode identifiers for a part of nodes that meet a priori condition of a single point decoding mode, wherein a geometric single point mode identifier is used to indicate whether to enable single point decoding; and in a case that the first mode identifier of the current to-be-decoded node is a first identifier, if nodes that have been decoded meet a first condition, directly performing octree decoding on the current to-be-decoded node, wherein the first identifier is used to indicate to decode the geometric single point mode identifiers for the part of nodes that meet the priori condition of the single point decoding mode;

wherein nodes in the constructed tree structure are decoded in a given order, and the first condition comprises that: a number of nodes that have been performed octree decoding and whose corresponding first mode identifiers are first identifiers is less than a first threshold.

11. The method according to claim 10, after the obtaining the first mode identifier of the current to-be-decoded node, further comprising:

in the case that the first mode identifier is the first identifier, if the nodes that have been decoded meet a second condition, decoding a geometric single point mode identifier corresponding to the current to-be-decoded node; and setting a first mode identifier of a next to-be-decoded node according to the geometric single point mode identifier;

wherein the second condition comprises that: the number of the nodes that have been performed octree decoding and whose corresponding first mode identifiers are the first identifiers is equal to the first threshold, and among the nodes that have been performed octree encoding and whose corresponding first mode identifiers are the first identifiers, a number of nodes that have only one child node occupied is greater than a fourth threshold.

12. The method according to claim 11, wherein the setting the first mode identifier of the next to-be-decoded node according to the geometric single point mode identifier comprises at least one of:

in a case that the geometric single point mode identifier indicates that a number of points included in the current to-be-decoded node is less than or equal to a preset number of points, setting the first mode identifier of the next to-be-decoded node as a second identifier; or in a case that the geometric single point mode identifier indicates that the number of points included in the current to-be-decoded node is greater than the preset number of points, setting the first mode identifier of the next to-be-decoded node as the first identifier.

13. The method according to claim 11, after the decoding the geometric single point mode identifier corresponding to the current to-be-decoded node, further comprising:

performing a second operation on the current to-be-decoded node according to the geometric single point mode identifier;

wherein the second operation comprises: octree decoding or single point direct decoding;

or, after the obtaining the first mode identifier of the current to-be-decoded node, further comprising:

in the case that the first mode identifier is the first identifier, if the nodes that have been decoded meet a fourth condition, setting the first mode identifier of the next to-be-decoded node as the first identifier;

wherein the fourth condition comprises that: the number of the nodes that have been performed octree decoding and whose corresponding first mode identifiers are the first identifiers is equal to the first threshold, and among the nodes that have been performed octree decoding and whose corresponding first mode identifiers are the first identifiers, the number of nodes that have only one child node occupied is less than or equal to the fourth threshold;

after the setting the first mode identifier of the next to-be-decoded node as the first identifier, further comprising:

performing octree decoding on the current to-be-decoded node.

14. The method according to claim 10, after the obtaining the first mode identifier of the current to-be-decoded node, further comprising:

in a case that the first mode identifier is a second identifier, decoding a geometric single point mode identifier corresponding to the current to-be-decoded node; and performing a second operation on the current to-be-decoded node according to the geometric single point mode identifier;

wherein the second operation comprises: octree decoding or single point direct decoding.

15. The method according to claim 14, wherein the performing the second operation on the current to-be-decoded node according to the geometric single point mode identifier comprises at least one of:

in a case that the geometric single point mode identifier indicates that a number of points included in the current to-be-decoded node is less than or equal to a preset number of points, performing single point direct decoding on the current to-be-decoded node; or in a case that the geometric single point mode identifier indicates that the number of points included in the current to-be-decoded node is greater than the preset number of points, performing octree decoding on the current to-be-decoded node.

16. The method according to claim 14, after the performing the second operation on the current to-be-decoded node according to the geometric single point mode identifier, further comprising:

if the nodes that have been decoded-meet a third condition, setting a first mode identifier of a next to-be-decoded node according to a number of decoded nodes where each node contains points less than or equal to a preset number of points;

wherein the third condition comprises that: the number of the nodes that have been performed octree decoding and whose corresponding first mode identifiers are second identifiers is equal to a second threshold;

wherein the setting the first mode identifier of the next to-be-decoded node according to the number of decoded nodes where each node contains points less than or equal to the preset number of points comprises at least one of:

if the number of decoded nodes that contain points less than or equal to the preset number of points is greater than a third threshold, setting the first mode identifier of the next to-be-decoded node as the second identifier; or if the number of decoded nodes that contain points less than or equal to the preset number of points is less than or equal to the third threshold, setting the first mode identifier of the next to-be-decoded node as the first identifier.

17. The method according to claim 10, before the obtaining the current to-be-decoded node in a target queue, further comprising:

setting a first mode identifier of a root node as a second identifier.

18. The method according to claim 10, wherein the obtaining the first mode identifier of the current to-be-decoded node comprises:

performing determination of the priori condition of the single point decoding mode on the current to-be-decoded node; and in a case that the current to-be-decoded node meets the priori condition of the single point decoding mode, obtaining the first mode identifier of the current to-be-decoded node.

19. An encoding control apparatus, comprising a processor, a memory, and a program or an instruction stored in the memory and executable on the processor, wherein when the program or the instruction is executed by the processor, steps of the encoding control method according to claim 1 are implemented.

20. A decoding control apparatus, comprising a processor, a memory, and a program or an instruction stored in the memory and executable on the processor, wherein the program or the instruction, when executed by the processor, causes the decoding control apparatus to perform:

obtaining a current to-be-decoded node in a target queue, wherein the target queue comprises nodes whose corresponding space blocks are occupied in a constructed tree structure;

obtaining a first mode identifier of the current to-be-decoded node, wherein the first mode identifier is used to indicate whether to decode geometric single point mode identifiers for a part of nodes that meet a priori condition of a single point decoding mode, wherein a geometric single point mode identifier is used to indicate whether to enable single point decoding; and in a case that the first mode identifier of the current to-be-decoded node is a first identifier, if nodes that have been decoded meet a first condition, directly performing octree decoding on the current to-be-decoded node, wherein the first identifier is used to indicate to decode the geometric single point mode identifiers for the part of nodes that meet the priori condition of the single point decoding mode;

wherein nodes in the constructed tree structure are decoded in a given order, and the first condition comprises that: a number of nodes that have been performed octree decoding and whose corresponding first mode identifiers are first identifiers is less than a first threshold.

* * * * *